US012809894B2

(12) United States Patent
Wolz et al.

(10) Patent No.: US 12,809,894 B2
(45) Date of Patent: Nov. 24, 2026

(54) SYSTEMS AND METHODS FOR PARTIAL INFORMATION RETRIEVAL USING DATA PROVENANCE TECHNIQUES

(71) Applicant: Riversound Solutions, LLC, Hamilton, NJ (US)

(72) Inventors: Ursula Caroline Wolz, Bennington, VT (US); Christopher Dunne, Bennington, VT (US); James Mangione, Phoenixville, PA (US)

(73) Assignee: Riversound Solutions, LLC, Hamilton, NJ (US)

( * ) Notice: Subject to any disclaimer, the term of this patent is extended or adjusted under 35 U.S.C. 154(b) by 0 days.

(21) Appl. No.: 18/923,961

(22) Filed: Oct. 23, 2024

(65) Prior Publication Data

US 2025/0190463 A1 Jun. 12, 2025

Related U.S. Application Data

(60) Provisional application No. 63/545,319, filed on Oct. 23, 2023.

(51) Int. Cl.
*G06F 16/334* (2025.01)
*G06F 16/3329* (2025.01)

(52) U.S. Cl.
CPC ...... *G06F 16/33295* (2025.01); *G06F 16/334* (2019.01)

(58) Field of Classification Search
None
See application file for complete search history.

(56) References Cited

U.S. PATENT DOCUMENTS

| | | | | |
|---|---|---|---|---|
| 8,442,940 | B1 * | 5/2013 | Faletti | G06F 16/367 |
| 9,710,332 | B1 * | 7/2017 | Fan | G06F 16/20 |
| 2008/0204831 | A1 * | 8/2008 | Kien | G06F 16/90 |
| 2010/0114630 | A1 * | 5/2010 | Adler | G06F 16/35 |
| 2018/0025307 | A1 * | 1/2018 | Hui | G06F 16/35 |
| 2024/0281710 | A1 * | 8/2024 | Rao | G06F 16/33 |
| 2024/0370709 | A1 * | 11/2024 | Siebel | G06F 16/358 |
| 2025/0112878 | A1 * | 4/2025 | Bayless | G06F 16/35 |
| 2025/0117583 | A1 * | 4/2025 | Choi | G06F 16/355 |

* cited by examiner

*Primary Examiner* — Son T Hoang
(74) *Attorney, Agent, or Firm* — McCarter & English, LLP

(57) ABSTRACT

The system includes an partial information retrieval processor that executes an event trigger software agent which identifies an event, a query listener agent which generates a query in response to the identified event, and a partial information retrieval agent which processes the query in accordance with one or more modular domain heuristic data structures and generates response data that includes provenance information. The system can include a knowledge base updating agent which updates a knowledge base using the response data, as well as a response generator agent. The system allows for the generation of natural language answers to questions in circumstances where only partial information is available, such as partially-identified question types or question contexts. A visualization user interface is also provided, which allows for visualization of partial information retrieval outcome.

16 Claims, 20 Drawing Sheets

20

SYSTEMS AND METHODS FOR PARTIAL INFORMATION RETRIEVAL USING DATA PROVENANCE TECHNIQUES

RELATED APPLICATIONS

The present application claims the priority of U.S. Provisional Application Ser. No. 63/545,319 filed on Oct. 23, 2023, the entire disclosure of which is expressly incorporated hereby reference.

BACKGROUND

Technical Field

The present disclosure relates generally to the field of computer-based question-and-answer (QA) systems. More specifically, the present disclosure relates to partial information retrieval using data provenance techniques.

Related Art

In today's information-laden world, consumers of data have unlimited and unfettered access to minutia, as well as broad general principles. However, the veracity, reliability, and accuracy of that data in decision-making can be problematic. By its very nature, digital data is an incomplete approximation of a natural phenomenon, and statistical or quantified methods of analysis produce approximations at some level of granularity. Further, logical inference structures are approximations of sentient behavioral processes. As a result, questions answered through digital processes can be unreliable because neither the granularity of the data, nor the path through which it passes (that is, its provenance), can be directly examined. As a result, there is a significant need to track data provenance using rules on domain-dependent information in a manner that includes not only where data comes from, but also the granularity of the data reasoned upon.

The importance of being able to gather and examine data provenance, as well as to allow decision making when data is incomplete, can be of significant use in particular domains. For example, in the field of computer-based health maintenance journals, it is beneficial to provide patients with a vehicle through which to answer specific questions of their healthcare providers about whether they have adhered to a course of action involving medication and lifestyle activities. This problem requires monitoring daily activity including diet, exercise, sleep, relaxation, and medication to produce direct outcomes such as acceptable blood sugar and cholesterol level, weight, and aerobic capacity. Input information can come from a variety of sources, such as direct sensors (e.g., scales), inferential sensors such as blood pressure cuffs, glucometers, pulse oximeters, and databases such as the U.S. Food and Drug Administration (FDA) Food Source database. Data can also come from human- or machine-interpreted nutrition labels.

However, two major information retrieval problems are critical to developing a useful health journal software application: (1) how the daily data is recorded; and (2) the accuracy of the recording. Small errors in detail based on assumptions (inferences) rather than fine-grained information can accumulate into misinformation. Moreover, in the context of question answering, such errors can produce a wrong answer. Furthermore, inaccurate targets, such as daily calorie consumption, can set patients up for failure. Additionally, an adherence problem emerges as a result of the foregoing problems. Patients give up on tracking their diets and taking medication, and often rebel against activity trackers because the mapping of data collection to results is at the wrong level of granularity (triggering the wrong inference set that conflicts with the results given the level of granularity). The goal of a computer-based health maintenance journal therefore poses a challenge of balancing the reliability of the input data with the expected outcomes, without overburdening the patient with details.

Other domains where data provenance is of importance include, but are not limited to, natural language question answering (e.g., chatbots, chatbot platforms, etc.), Internet search, generative artificial intelligence, real-time data acquisition and process control, sporting events, medical diagnosis and treatment, and other important domains. Still further, generative artificial intelligence (large language models) currently fail to track data transformations, and tend to create opacity rather than transparency in their reasoning. Further, their heuristics, rather than being transparently represented within a domain, are instead produced using trained learning systems, almost all of which are derivatives of neural networks. However, the input data (e.g., the training data set) and the training process are often not documented, which can lead to serious "hallucinations" within such systems. Additionally, while semantic based natural language processing (NLP) question-and-answer (QA) systems exist, such systems typically require exact knowledge representation or extremely fine-grained coded heuristics, and do not take into account domain knowledge.

Accordingly, what would be desirable are systems and methods for partial information retrieval using data provenance techniques which address the foregoing and other needs.

SUMMARY

The present disclosure relates to systems and methods for partial information retrieval using data provenance techniques. The system includes an partial information retrieval processor that executes an event trigger software agent which identifies an event, a query listener agent which generates a query in response to the identified event, and a partial information retrieval agent which processes the query in accordance with one or more modular domain heuristic data structures and generates response data that includes provenance information. Optionally, the system can include a knowledge base updating agent which updates a knowledge base (e.g., a collection of one or more modular domain heuristic data structures) using the response data, as well as a response generator agent which generates a human-readable (e.g., text or image) response based on the response data. Advantageously, the system allows for the generation of natural language answers to questions in circumstances where only partial information is available, such as partially-identified question types or question contexts. A visualization user interface is also provided, which allows for visualization of partial information retrieval outcome.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for partial information retrieval using data provenance techniques, as discussed in detail below in connection with FIGS. 1-5.

Figure 1:
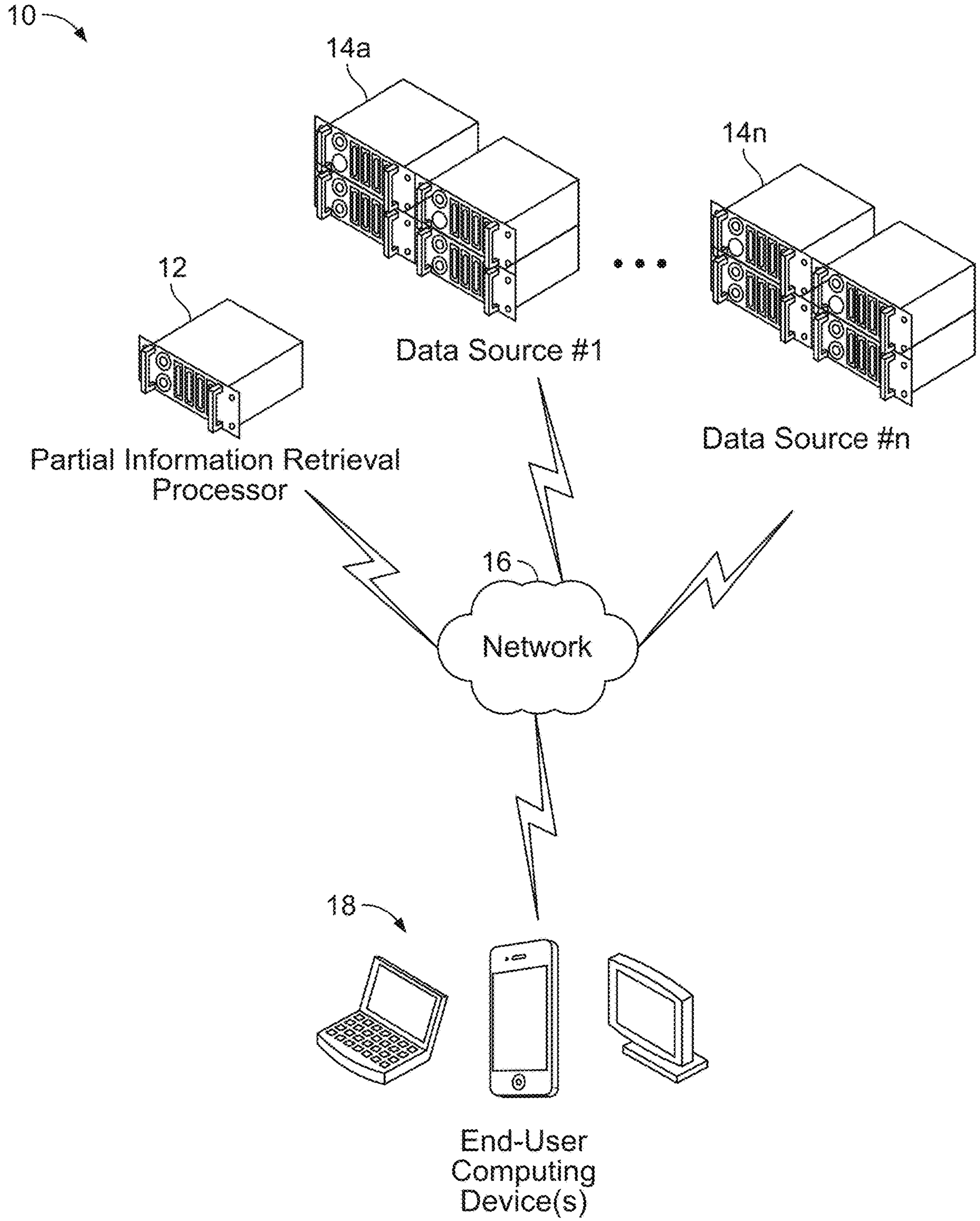
FIG. 1 is a diagram illustrating the system of the present disclosure.

FIG. 1 is a diagram illustrating the system of the present disclosure, indicated generally at 10. The system 10 includes a partial information retrieval processor 12 that is programmed in accordance with the present disclosure. The processor 12 is in communication with an end-user computing device 18 via a network 16, receives a query for information issued by a user using the end-user computing device 18, and processes the query in accordance with the processes disclosed herein in order to retrieve information in response to the query issued by the user. Importantly, as discussed in greater detail below, the processor 12 determines whether a sufficient amount of information exists to answer the query based on one or more domain-specific heuristics executed by the processor 12, even in the presence of partial information, and returns both the information and provenance relating to the information. The processor 12 can obtain information for responding to the query from one or more data source computer systems 14*a*-14*n* in communication with the processor 12 via the network 16. The data source computer systems 14*a*-14*n* could include database servers that store information relating to various domains of knowledge.

The processor 12 could include one or more suitable computer systems programmed in accordance with the present invention, such as a personal computer, server, cloud computing platform, or other suitable processor. The processor 12 could be programmed using any suitable high- or low-level programming language, including, but not limited to, C, C++, Java, Javascript, Python, or other suitable programming language. Additionally, the processing steps disclosed herein could be embodied as computer-readable instructions stored in a non-transitory, computer-readable medium provided in, or in communication with, the processor 12. The network 16 could be any suitable computer network including, but not limited to, a local area network, wide area network, an intranet, the Internet, a cellular data communications network, or any other suitable computer network. The end-user computing device 18 could include, but is not limited to, a personal computer, a tablet computer, a laptop computer, a mobile computing device, a smart cellular telephone, or any other suitable computing device. Additionally, it is noted that the functions performed by the processor 12 could be performed by the end-user computing device 18. Still further, the end-user computing device 18 could include a smart watch, and/or the queries generated by the computing device 18 could alternatively (or, additionally) be generated by one or more sensors, sensor agents that ask questions (e.g., in a form that is not intuitive to a human being), an Internet-of-Things (IoT) device, an artificial intelligence (AI) platform and/or chip, or any other device/platform/service that can generate a question.

Figure 2:
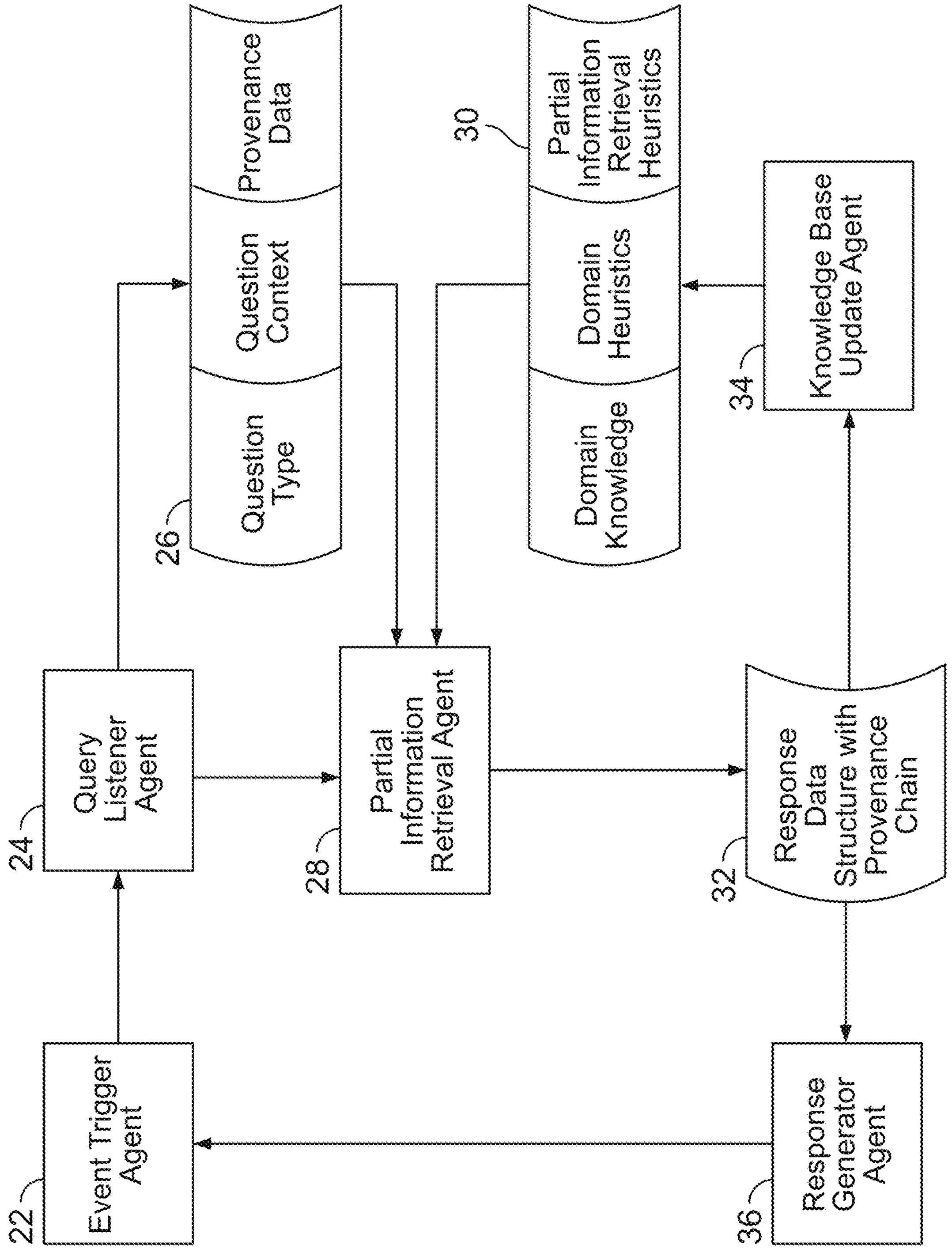
FIG. 2 is a diagram illustrating software components and data structures in accordance with the present disclosure.

FIG. 2 is a diagram illustrating software components and data structures in accordance with the present disclosure, indicated generally at 20. The system includes an event trigger agent 22, a query listener software agent 24, a query data structure 26 generated by the query listener software agent 24, a partial information retrieval software agent 28, a modular domain heuristics data structure 30, a response data structure 32 generated by the partial information retrieval software agent 28, a knowledge base updating software agent 34, and a response generator agent 36. The features of each of these components is described in detail as follows.

The event trigger agent 22 monitors for an event that is suitable for a question-and-answer cycle. Such triggers could include, but are not limited to, information generated by a sensor (such as an electro-mechanical sensor, an audio input, a gesture input, an environmental sensor, etc.), a query generated by a user (e.g., using one of the end-user computing devices 18 of FIG. 1), a process occurring in a natural language dialog system (e.g., a chatbot), the results of a previous query trigger, or any other event that gives rise to a question-and-answer cycle. The trigger agent 22 generates event data, and if the trigger is within a question-and-answer system (e.g., in a natural language dialog system), and/or as a follow-up to a previous question, it may include a provenance map. The event data could be in any format suitable for a particular triggering event/entity, from a simple numeric signal to a complex software object structure.

The query listener agent 24 can be instantiated by a recognized event trigger (e.g., by the event trigger agent 22), and is a listener software object that has baseline information about its triggers and can also include data provenance information. For example, if the agent 24 is instantiated in response to an event generated by a sensor (and detected by the trigger agent 22), it can keep track of information relating to the sensor, such as sensor type, manufacturer name, model number, serial number, etc. If the agent 24 is instantiated in response to a cloud-based event detected by the agent 22, it can keep track of information such as a Uniform Resource Locator (URL) link associated with the cloud-based event, an indication of whether a website corresponding to the URL link is a government database, or is associated with a non-profit or commercial entity. The agent 24 records the time of the event detected by the agent 22 and parses event data into the query data structure 26.

The query data structure 26 includes data relating to a question type, a question context, and provenance data (either created by the agent 24 or added to a provenance map that the agent 24 may have received). The question type is domain-dependent and can be as specific or broad as an application domain may require. It provides the query instruction type for accessing domain knowledge structures. For example, the question type could be as specific as a formal Structured Query Language (SQL) or more general (e.g., a text stream), depending on the domain. The question context provides the focus of the query, and can be represented as an attribute of an attribute value pair, where the result returned by the system is the value. Similar to the question type, the question context can be a text stream to focus the response of a large language model. The provenance data can be a map of the processes through which the input data (e.g., event data generated by the event agent 22) is transformed into output (e.g., response structure), including the input into each process in the map. The map can be organized by granularity (much like a physical map, where high-level countries are shown, followed by states, cities, etc.). The provenance data is utilized by the partial information retrieval agent 28 to produce a response. Simplified provenance maps can be single bundles of event data, originating sensor information, and time information. The granularity of the map can be dependent upon the requirements of the domain database search techniques utilized by the system. Additionally, the provenance map can be fully or partially encrypted to prevent tampering, and a key can also be included that only allows for decryption of the map by processes that require the map for decision-making purposes.

The partial information retrieval agent 28 receives and processes the query data structure 26 and creates the response data structure 28, and its behavior is controlled by the modular, domain-specific heuristics data structure 30. A detailed description of the processes carried out by the agent 28 is provided below in connection with FIGS. 3-4.

The modular domain heuristic data structure 30 includes information relating to domain knowledge, domain heuristics, and partial information retrieval heuristics. These components are defined at levels of specificity necessary to determine the sufficiency of a query structure, and can be embodied as knowledge objects in software. Additionally, the domain knowledge, domain heuristics, and partial information retrieval heuristics can be implemented as processes ranging from fixed selection statements ("if . . . then" conditional logic) in software code, to machine learning architectures. It is noted that the data structure 30 is modular in nature, in that, depending on the domain being processed by the system, one or more customized data structures 30 could be utilized and/or substituted by the agent 28. For example, if the agent 28 is processing a query in the domain of food data, a specific data structure 30 with its own customized heuristics germane to food data could be utilized by the agent 28 to develop a query response (the heuristics of the data structure 30 controlling operation of the agent 28), whereas if the agent 28 needs to process a future query in a completely different domain (e.g., well data, cemetery data, library data, etc.), then a different, customized (modular) data structure 30 could be utilized by the agent 28 with its own set of heuristics in order to control operation of the agent 28 and development of a response tailored to that domain.

The domain knowledge can be encoded in a form appropriate for a domain, from a simple lookup to a complex primitive to composite knowledge structures. The information encoded in the data structure 30 can be incomplete or extraneous, thereby mitigating the need to "clean" or enhance the information. For example, a data object representing an apple might include detailed information about the nutritional value of a medium apple. The provenance of the data may be from a commercial website for weight management. Alternatively, an entry for 'apple' might include both the 'medium' apple as well as the full details for 100 grams of apple from the FDA Food Source database. Alternatively, the domain knowledge could be as simple as "apple, carbs, 34."

The domain heuristics of the data structure 30 comprise rules or inferences that can be applied to the domain structure to determine whether there is sufficient or insufficient data available to produce a response to a query. For example, a heuristic may be encoded that states that if there is only one entry, such as "apple, carbs, 34," then the system should use such entry and note the provenance associated with the entry (e.g., indicating that the entry came from a user's journal entry, for example), but if there is an FDA Food Source also available, then the system should also use that source in developing a response and include both sources in the provenance for later disambiguation.

The partial information retrieval heuristics of the data structure 30 comprise a set of rules that can be tailored to a domain, and control operation of the agent 28 to generate a response to a query generated by the query listener agent 24. They provide general principles for deciding whether the question type and question context are recognized, and the set of possible results returned can be bundled into either a successful response or an unsuccessful response. Processing steps carried out by the agent 28 are described in more detail below in connection with FIGS. 3-4.

The response data structure 32 bundles all of the information collected by the agent 28 into a domain-specific data structure, and is processed by both the knowledge base update agent 34 and the response generator update agent 36. Included in the structure 32 is an indication of whether the response is successful or unsuccessful in answering the query generated by the query agent 24.

The knowledge base update agent 34 is an optional component of the system that can update one or more persistent stores (e.g., update one or more of the modular domain heuristic data structures 30), either in real time or through a deferred batch process, and with or without human supervision. Using this agent 34, the system can develop an up-to-date repository of information relating to domain-specific queries and associated heuristics.

The response generator agent 36 generates a natural language response to the query generated by the agent 24, which can be generated and transmitted to the user (e.g., to one or more of the devices 18 of FIG. 1). The agent 36 can execute a natural language generation process to generate a visual or textual output dependent upon the domain. The response can trigger an event to generate a new or follow-up question (which event would be detected and handled by the event trigger agent 22 as discussed above) that includes provenance data augmented by the agent 28. For example, the response might have heuristics that lead to a simple answer, such as "there are 34 grams of carbs in a medium apple" or, given a more complex question, the agent 36 might produce a visualization of the carbs in relation to other macronutrients in a particular meal.

Figure 3:
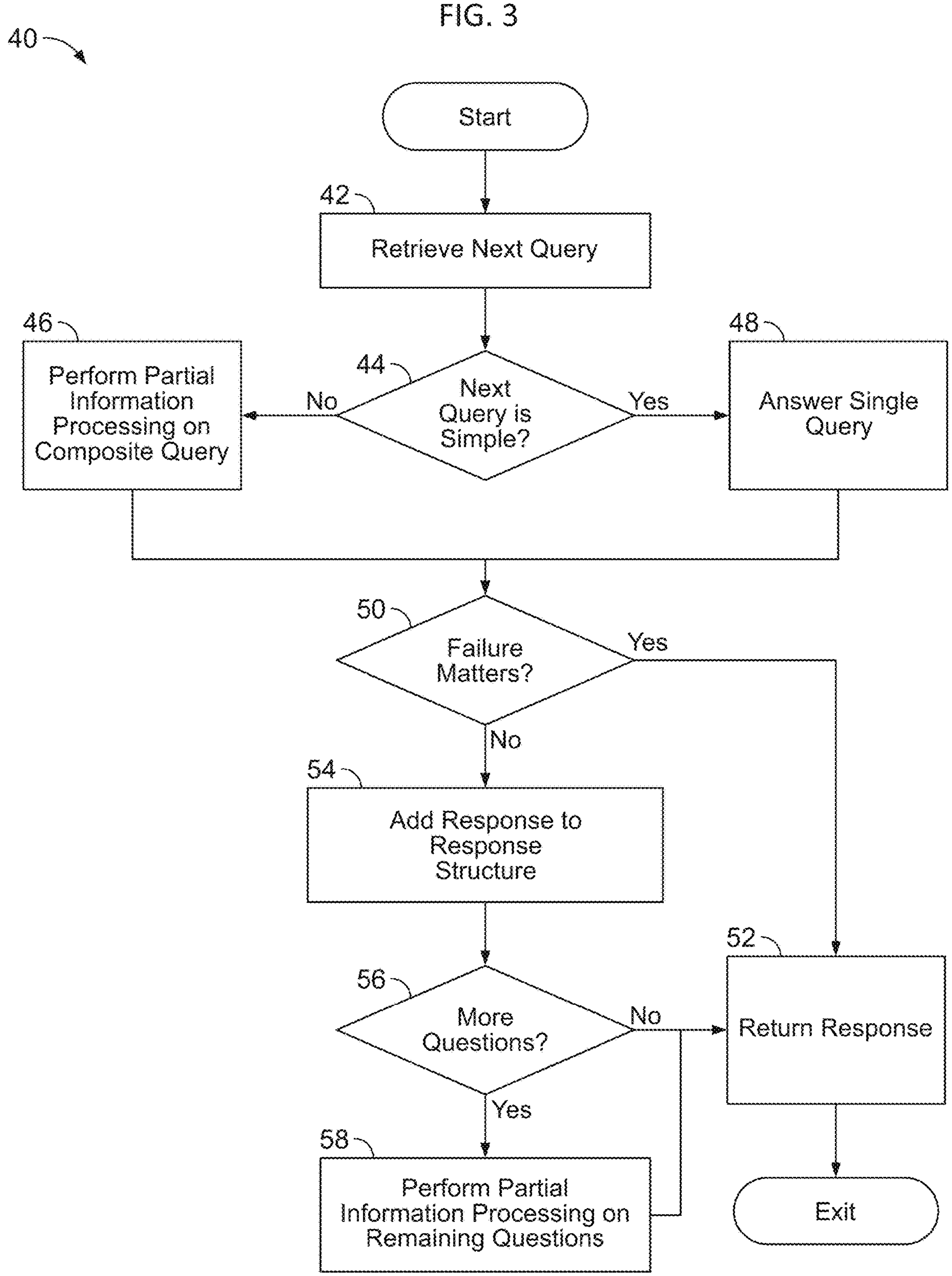
FIG. 3 is a flowchart illustrating processing steps carried out in accordance with the present disclosure for partial information processing of a natural language query.

FIG. 3 is a flowchart illustrating processing steps carried out in accordance with the present disclosure, indicated generally at 40, for partial information processing of a natural language query. More specifically, the steps 40 are carried out by the agent 28 of FIG. 2. Beginning in step 42, the agent 28 retrieves a query, which could be supplied by the query agent 24 of FIG. 2. In step 44, a determination is made as to whether the query is simple, e.g., whether the query has a single query or multiple (composite) queries (which can be domain-dependent and represented as a list of bundles). If a negative determination is made, step 46 occurs, wherein the system recursively calls the processing steps of FIG. 3 on the multiple (composite) queries. Otherwise, step 48 occurs, wherein the system processes a single query (question) utilizing the processing steps of FIG. 4, discussed in greater detail below. Both steps 46 and step 48 return an indication of whether the query response attempt was successful or failed. Success is dependent upon the domain heuristics encoded in the data structure 30 of FIG.

2. For example, a simple failure might be that a food is not known or inferred. Success might be determined locally by recording an inference, e.g., that it is known that a medium apple has 34 grams of carbs, and it is inferred that the question was about a medium apple. Even with sparse or "dirty" data (e.g., data that is incorrect or misleading), but includes an inference chain in the provenance and includes a result added to the response structure. Importantly, the domain heuristics can be as granular or general as necessary for the domain of the system, and are not hard-coded. Additionally, such heuristics can guard against "hallucinations" by the system.

In step 50, a determination is made as to whether a query response failure (which could be generated in steps 46 or 48) matters. If so, step 52 occurs, wherein the system generates and returns a response. Otherwise, step 54 occurs, wherein the system adds the response to the response structure. Then, in step 56, a determination is made as to whether there are more questions in the query to be answered. If not, step 52 occurs. Otherwise, step 58 occurs, wherein the system performs further partial information processing on the remaining questions by recursively calling the processing steps 40 of FIG. 3 on the remaining questions of the query. Then, the response is generated and returned in step 52.

Figure 4:
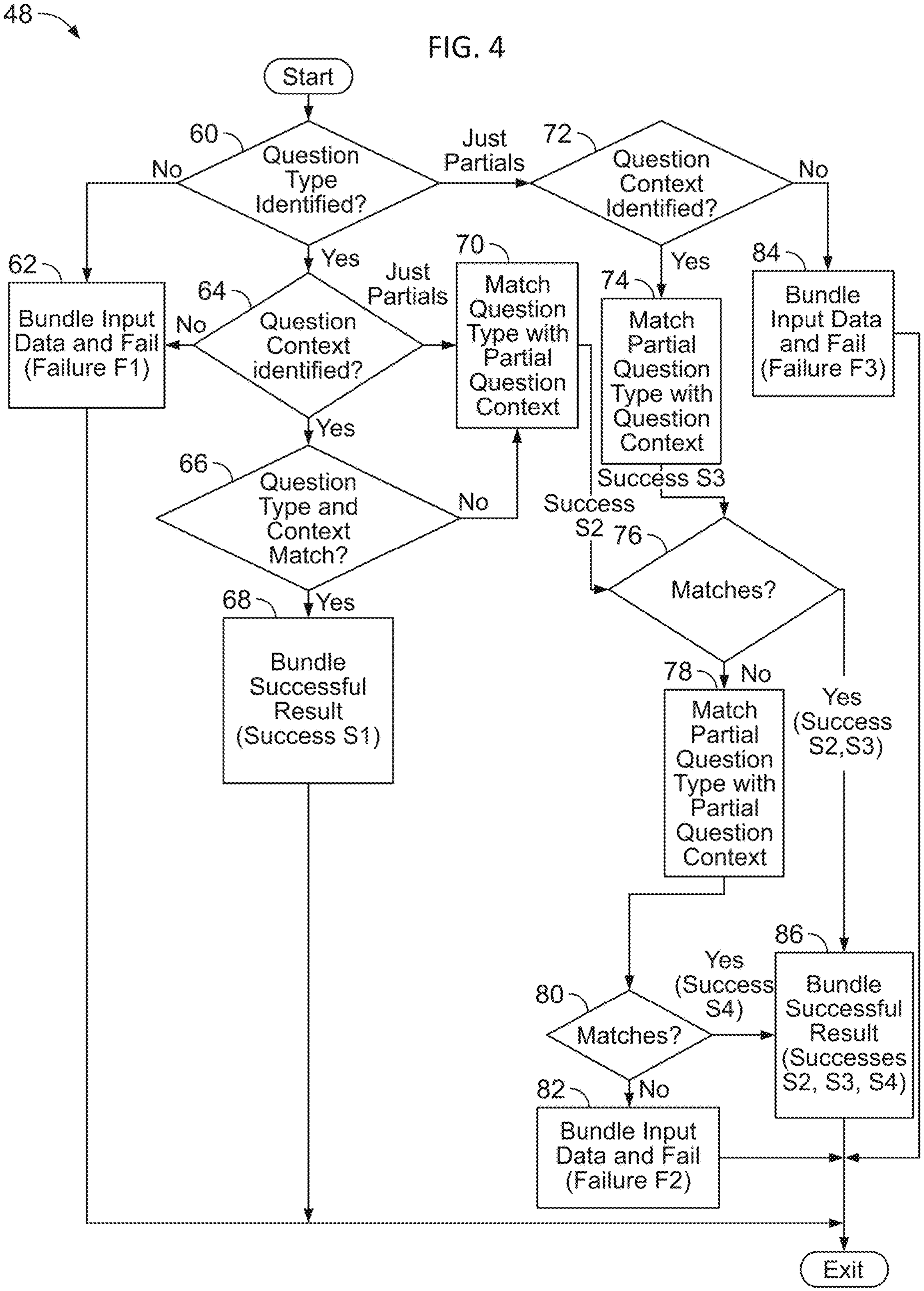
FIG. 4 is a flowchart illustrating processing steps in accordance with the present disclosure for answering a single question.

FIG. 4 is a flowchart illustrating processing steps in accordance with the present disclosure for answering a single question. More specifically, FIG. 4 illustrates step 48 of FIG. 3 in greater detail. In step 60, the system determines whether the type of question can be identified from the query. If not, step 62 occurs, wherein the system bundles the input data (e.g., the query question and a failure indication) and generates a failure notification (failure F1), and processing ends. For example, if the system if configured to handle queries related to food and the question is complete gibberish, a failure would be generated. This is an example of domain boundary error checking. Otherwise, if the system is able to determine the question type directly (e.g., from the text of the question presented in the query), then step 64 occurs, wherein the system determines whether the question context can be identified. If a negative determination is made, step 62 occurs, and failure notification F1 is generated and processing ends. In such circumstances, the question is of no use. Otherwise, step 66 occurs, wherein the system determines whether the question type and the question context match. If so, step 68 occurs, wherein the system bundles the results, generates a success notification (success S1), and processing ends. In such circumstances, both the question type and the question context are clearly identified in the knowledge base (e.g., in a reverse index), and the query produced on the domain database returns a result. The question type and context are bundled together with the result, the query is added to the provenance map, and the map is added to the bundle. In the event that only partial question context can be identified in step 64, or if the question type and context are determined in step 66 not to match, step 70 occurs, wherein the system matches the question type with a partial question context. In such circumstances, the question type is applied to each of the contexts (which can be carried out by generating a cross-product between the question type and the partial question context) to produce a list of results. If at least one result is determined in step 76 as a match (as determined by the domain heuristic standards specified in the data structure 30), then the full bundle is returned in step 86, a success notification S2 is generated, and processing ends.

In the event that only a partial question type is determined to be identified in step 60, then step 72 occurs, wherein a determination is made as to whether the question context can be identified. If so, step 74 occurs, wherein the system attempts to match the partial question type with the question context. Then, in step 76, a determination is made as to whether the partial question type and question context match. If so, the full bundle is returned in step 86, a success notification S3 is generated, and processing ends. Otherwise, step 78 occurs, wherein the system attempts to match the partial question type with the partial question context. Then, step 80 occurs, wherein a determination is made as to whether the partial question type matches the partial question context. If so, step 86 occurs, wherein the full bundle is returned, a success notification S3 is generated, and processing ends. In such circumstances, the question "carbs in apples" could have generated a question type such as "How many Y in X" where the intent was "Does X have Y." The candidate types inferred to be sufficient are collected into an unordered collection (perhaps represented as a list) of partial question types. The question context is then evaluated as sufficient to be identified. If a single perfect match occurs, then it is used with each item in the partial question type list to produce a list of potential matches. If the potential list contains at least one match, then the results are bundled and returned as a successful result.

In the event that a negative determination is made in step 80, step 82 occurs, wherein the input data is bundled, a failure notification F2 is generated, and processing ends. In such circumstances, there is still value in understanding and returning the failed result. For example, the question "Antioxidants in a honey crisp" may lead to failure if the knowledge representation cannot identify this kind of apple and there is no knowledge of antioxidants, nor how the two are related. Returning the heuristic (e.g., that the context is not in the knowledge base) can lead to more refined questions. Finally, in the event that a negative determination is made in step 72 (i.e., the question context cannot be identified), step 84 occurs, wherein the system bundles the input data and generates a failure notification F3. It is noted that, in all of the failure paths (failure notifications F1, F2, and F3), the input data provenance is augmented with a bundle of heuristics that produced the unsuccessful result. Importantly, the failure of one question within the framework of a composite question may still allow success at a higher level (with an optional qualifier).

The processing steps 48 of FIG. 4 are based on the following principles: (1) the question type can be sufficiently identified to produce an answer; (2) the question context can be sufficiently identified to produce an answer; (3) the question type and the question context are sufficiently detailed to produce an answer; (4) an exact answer is only one of a potential set of likely answers (either the question type or the context may contribute to failing to find an exact match, in which case the domain heuristics can provide recommendations for a question type, a question context, and the response tuple that may meet the question intent; (5) ranking algorithms are general heuristics and can misunderstand the question and context, providing inappropriate responses; (6) identifying missing or extraneous (e.g., dirty) data can be written into the domain heuristics; and (7) the results are returned at the semantic level, suggesting that hallucinations can be prevented or at least recognized as such.

Additionally, it is noted that the various bundles generated by the processing steps of FIG. 4 can consist of either a single tuple or a collection of tuples, such as: {question type, question context, result (which can be either the answer to the question or a "failed" token), heuristic used, and the provenance chain}. Moreover, the provenance chain (or, map) could be represented as a URL link, a token, a linked list, a blockchain, or in any other suitable format.

The domain heuristics of the data structure 30 discussed in connection with FIG. 2 above provide an automated mechanism for loosening the specificity on the data lookup processes of the system of the present disclosure. The domain heuristics need not be based on statistical ranking or simple symbol proximity, and utilize semantic (instead of statistical or neural) natural language processing. The domain heuristics can be implemented through classic rules implementation in a decision system, and can execute such that the system attempts to find a solution (an answer to a question) until a pre-defined cutoff is reached (in essence, the system "bottoms out" depending on the sophistication of the rule set).

Figure 5:
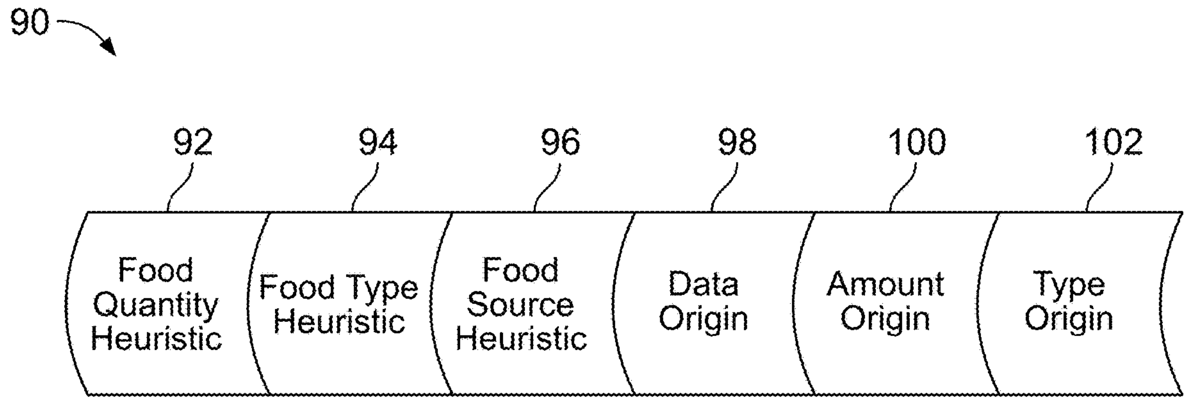
FIG. 5 is a diagram illustrating a domain-specific heuristic for partial information processing of a query.

FIG. 5 is a diagram illustrating a domain-specific heuristic for partial information processing of a query. The heuristic 90 could relate to the nutrition domain, and could include the following components: a food quantity heuristic 92 (e.g., if there is no input data on quantity, assume that a standard quantity applies), a food type heuristic 94 (e.g., if there is no specificity of the type of food, assume a generic food type), a food source heuristic 96 (e.g., if the source is the FDA Food Data database, the source is accurate; otherwise, if the source is a food label, it is accurate), a data origin indication 98, an amount origin 100, and a type origin 102. As can be seen, the domain heuristic 90 is tailored for questions relating to nutrition subjects, and controls operation of the agent 28 of FIG. 1. Of course, other heuristics can be tailored to other domains. For example, in the domain of well data, the following heuristics can be defined: a physical well tag was properly installed, a well is assigned to a specific property, no property has more than one well, data entry has a misspelled name or address, data entry has inaccurate GIS coordinates, data entry has a wrong tag number, etc. Still other domain-specific heuristics could be defined and utilized by the system, such as for use in connection with cemetery data questions, library database questions, historical inventory questions, etc.

It is noted that the systems and methods discussed herein in connection with FIGS. 1-5 could also provide a customized visualization user interface that provides a succinct, informative, and trustworthy report of an information retrieval outcome via visualization. Such an interface will now be discussed in connection with FIGS. 6-18.

In the natural (non-digital) world, information is only as accurate and reliable as the methodology employed by the sentient reporter and, more critically by the media through which that information is presented. Historians assert that at every stage from observation to recording to reporting, the quality of the initial observation is modified via cultural, social and psychological norms, biases, and assumptions. Information can be trusted only when its origins and transformations can be examined or referenced. Attribution is essential to reliable information retrieval. Information provenance is key to good decision making. In computing information systems, informative responses to user queries via visualization-based user interfaces must provide a means for interactively examining the provenance of that information—often referred to as "drilling down." This is especially critical to summation techniques within in conversational AI systems. The customized visualization interface described in FIGS. 6-18 is a vehicle through which the difference between two quantitative summative entities can be compared succinctly within a domain context, based on domain heuristics, and recursively provide elaboration of the methods through which those quantities were calculated.

Current digital technologies provide the illusion that quantified data is precise, and that current data retrieval, analysis, and reporting techniques maintain that precision. This is a significant problem when inappropriate visualization techniques are applied to data that may be incomplete or aggregated in a manner without attention to its provenance chain. It is not sufficient to provide links to source, but instead necessary to allow a user to examine the aggregation process directly. This is particularly problematical for individuals making personal decisions based on incomplete information sourced both from their personal observations and external information sources (e.g., media, the Internet, libraries, domain professionals (both through computer-based media and direct communication), etc.) Standard visualization techniques ranging from lists and charts to graphs to animations, and video recordings may be useful at demonstrating phenomena, but are equally able to obfuscate and elude. The visualization interface of FIGS. 6-18 therefore addresses a critical problem: how to demonstrate clearly the relationship between two aggregated datum with potentially, but not necessarily, dissimilar provenance.

Figure 6:
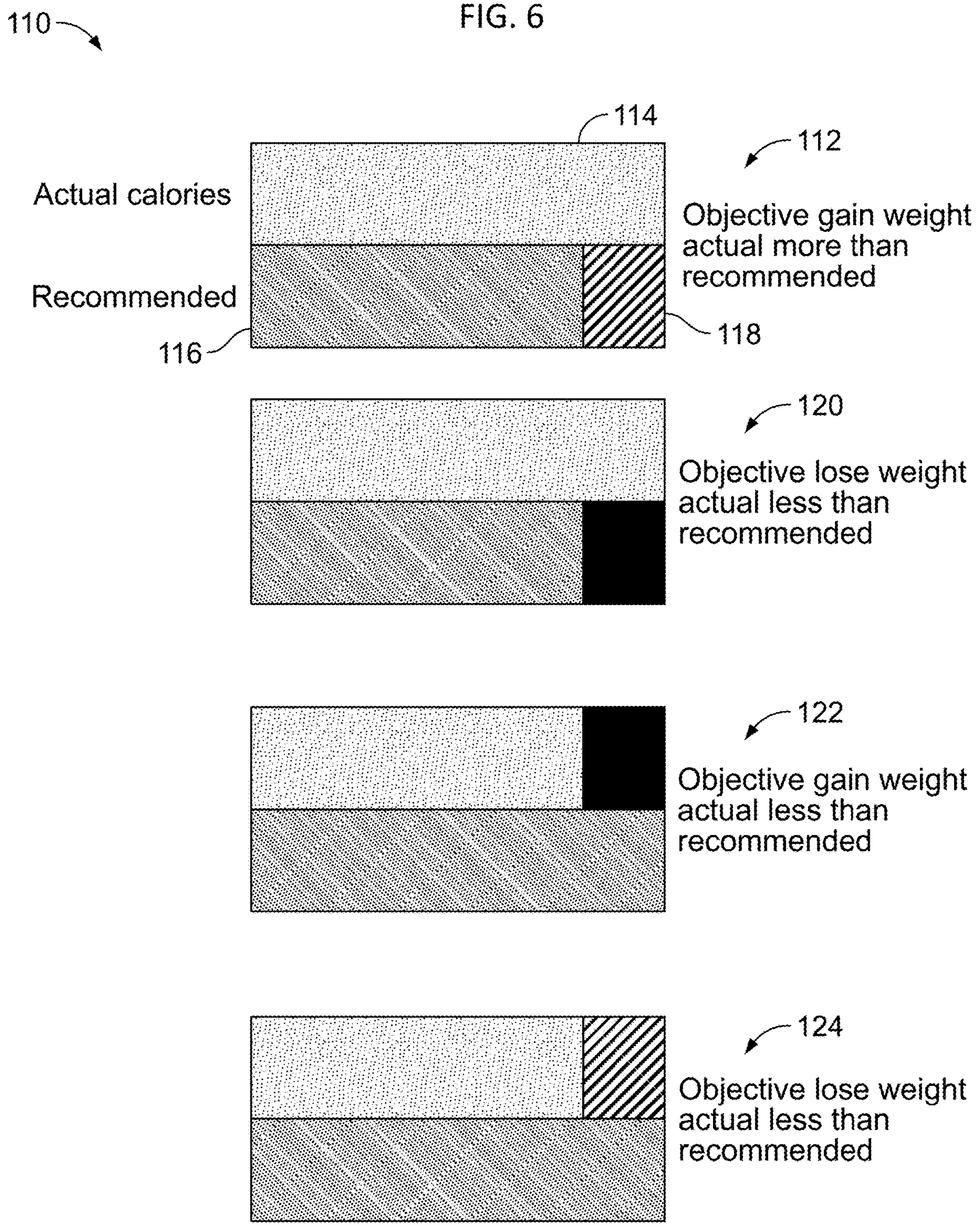
FIGS. 6-9 are diagrams illustrating a customized visualization user interface in accordance with the systems and methods of the present disclosure.

FIG. 6 is a diagram illustrating a sample visualization user interface screen 110 generated by the systems and methods of the present disclosure. The example provided here comes from health care: reporting the difference between actual calorie intake and recommended amount to lose, maintain or gain weight. Of course, other types of visualizations are possible. The visualization interface 110 of FIG. 6 includes four visualization "pieces" 112, 120, 122, and 124 which are generated based on the difference between the actual and recommended number of calories in the context of losing or gaining weight. The actual amount is identified by upper section 114 of the visualization piece 112, and is compared with the recommended amount identified by lower section 116 of the visualization piece 112. The difference is represented by difference section 118, which could be colored to indicate whether an objective of the visualization piece 112 has been met (e.g., red or green depending on the domain specific objective of the visualization). The upper and lower sections 114 and 116 could also be color-coded if desired (e.g., the upper section could be colored blue and the lower section could be colored aqua). The pieces 112, 120, 122, and 124 either directly represent a terminal quantifiable entity, or a collection of pieces that can be mapped directly to a datum. Terminal pieces are not simple quantitative values but include their provenance, allowing them to be visually expanded into further "pieces" or into other more appropriate visualizations. These will be illustrated below.

To articulate the novelty of this approach, the problem of representing weight loss goals is presented herein, but of course, other types of visualizations are possible. Weight loss, despite the overwhelming information available on the Internet, is a simple calculation for an individual: the calories consumed in a day must be consistently less than an individualized calculated maintenance amount. "Diet programs" have promoted this concept as far back as the 18th century. Complex models, methods, and visualizations are available for assisting individuals in mapping their personal consumption to goals determined by generalized (and often conflicting) assumptions and calculations.

At their core, existing visualizations represent the calorie consumption goals as precise quantitative data. Data aggregation without provenance hides that precise target behind rules prescribing "good", "neutral" and "bad" foods, and rarely if ever provides transparency for these categorizations. The information is incomplete but is represented visually as complete and absolute as a goal to achieve. Similarly, actual calories consumed are assumed to be precisely measured, when it is always an estimate as the USDA nutrition website asserts. For example, a "Honey Crisp Apple" listed on the USDA FoodData website is calibrated to 100 g based on a well-established methodology. But at 60 calories/100 grams, a precise calorie count for an actual apple could vary significantly. In a typical day with a target of 2000 calories (however well disguised by the weight loss industry), the accumulation of those small differences can statistically lead to percentage of error that can indeed impact calorie deficiency goals. Forgetting to record a candy bar purchased during a commute home can similarly thwart precise comparison of targets and actual values.

Visualizing incomplete or inaccurate data as precise data points leads to misinterpretation that, in turn, can lead to failed expectations. For example, if an established recommended calorie intake is 2000 calories, and the recommended daily deficit is 200 calories, the prediction is that an individual will lose about a pound per week in a healthy manner. If weight is not lost at that rate, it may very well be that the data recording is not sufficiently accurate for these precise targets and the visualizations are unable to demonstrate that inaccuracy. Visualizations that support "drilling down" into the provenance of data can provide explanations for failed outcomes that don't blame the victim (e.g. not enough will power, didn't properly take the medication, didn't follow an exercise regimen, etc.). The visualization interface described herein removes the value judgement and provides a visualization that provides, at a glance, the relationship between, and individual provenance of, two aggregate and potentially inaccurate values. Depending on the immediate needs of the user, the visualization interface can produce multiple viewpoints of a data set.

Figure 7:
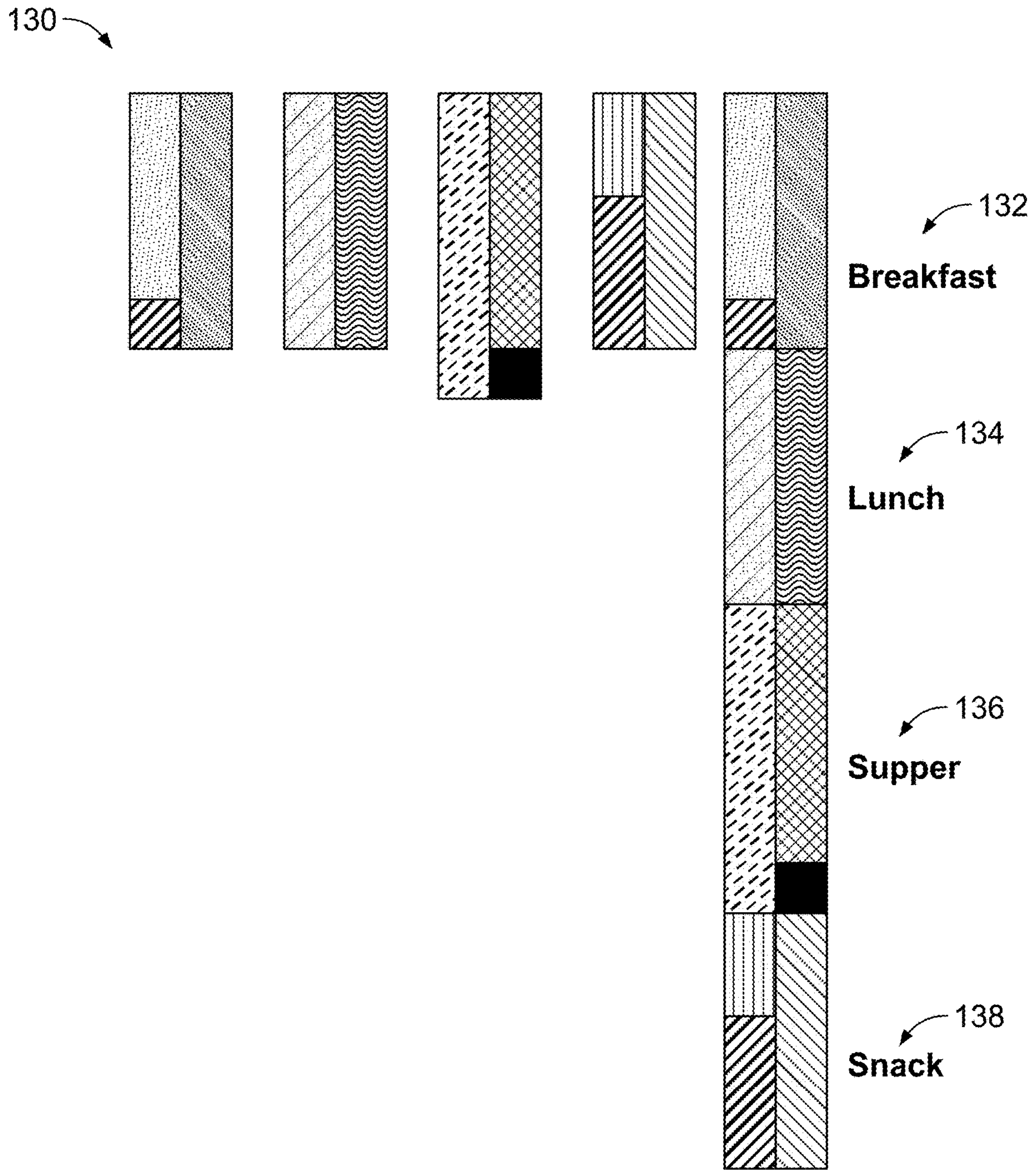

FIG. 7 illustrates a second visualization interface 130 generated by the systems and methods of the present disclosure, and shows how visualization pieces 132-138 (corresponding to breakfast, lunch, supper, and dinner, respectively) can be organized into representing four meals in a day. In the visualization shown, "supper" actual calories exceeds the recommendations, and "lunch" actual calories match the recommendation. Each meal is color coded, with actual calories to the left of recommended calories. Alternative visualizations can be generated depending on the context.

Figure 8:
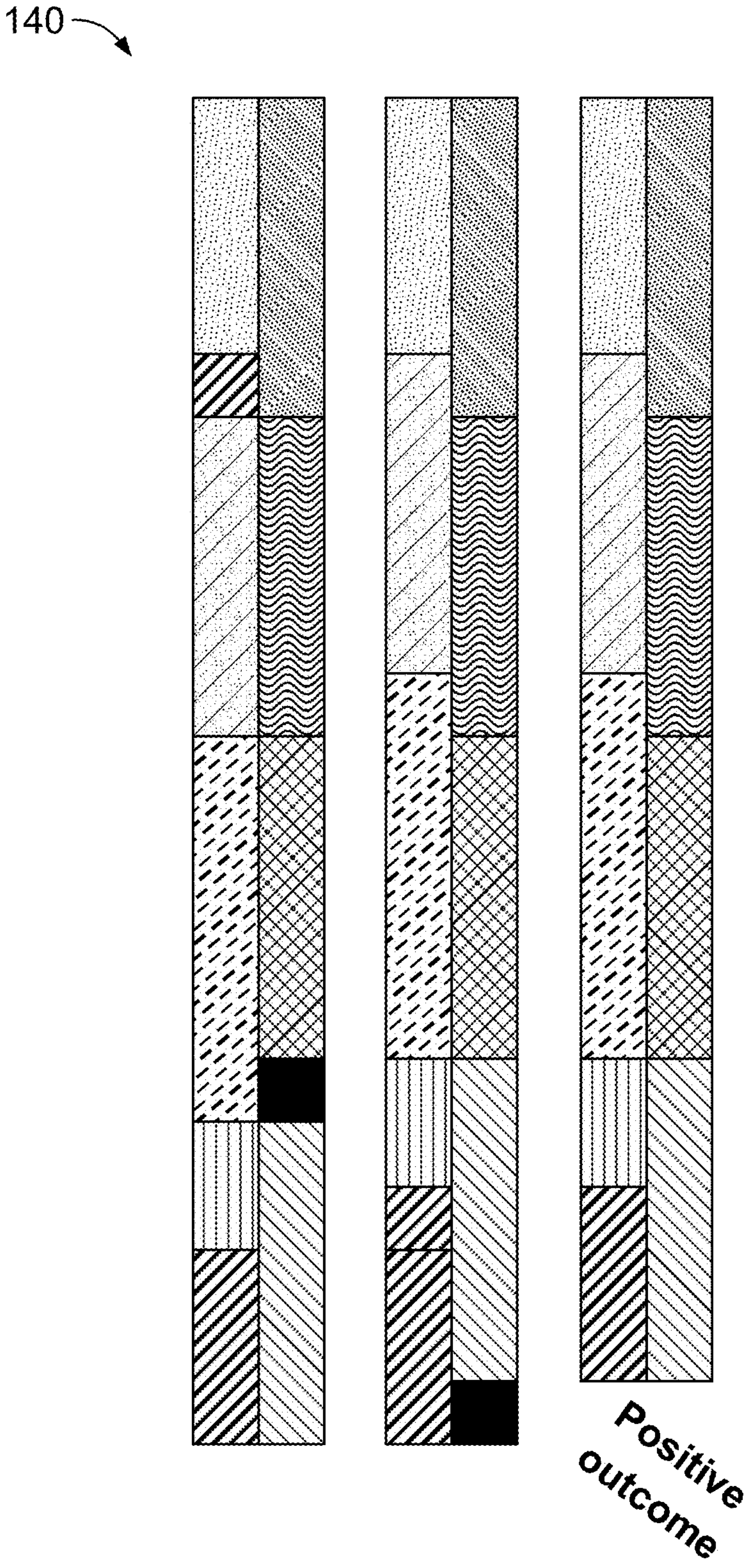

FIG. 8 illustrates a third visualization interface 140 generated by the systems and methods of the present disclosure, wherein the "raw" summation of meals into days obscures whether there was a deficit in calories consumption. Moving the "difference" pieces to the bottom highlights that there is indeed a deficit but obscures the total actual calorie count. The "piece" on the right shows clearly that there is a deficit, but hides which meals contributed to such deficit. The alternatives can both be available to a user.

Figure 9:
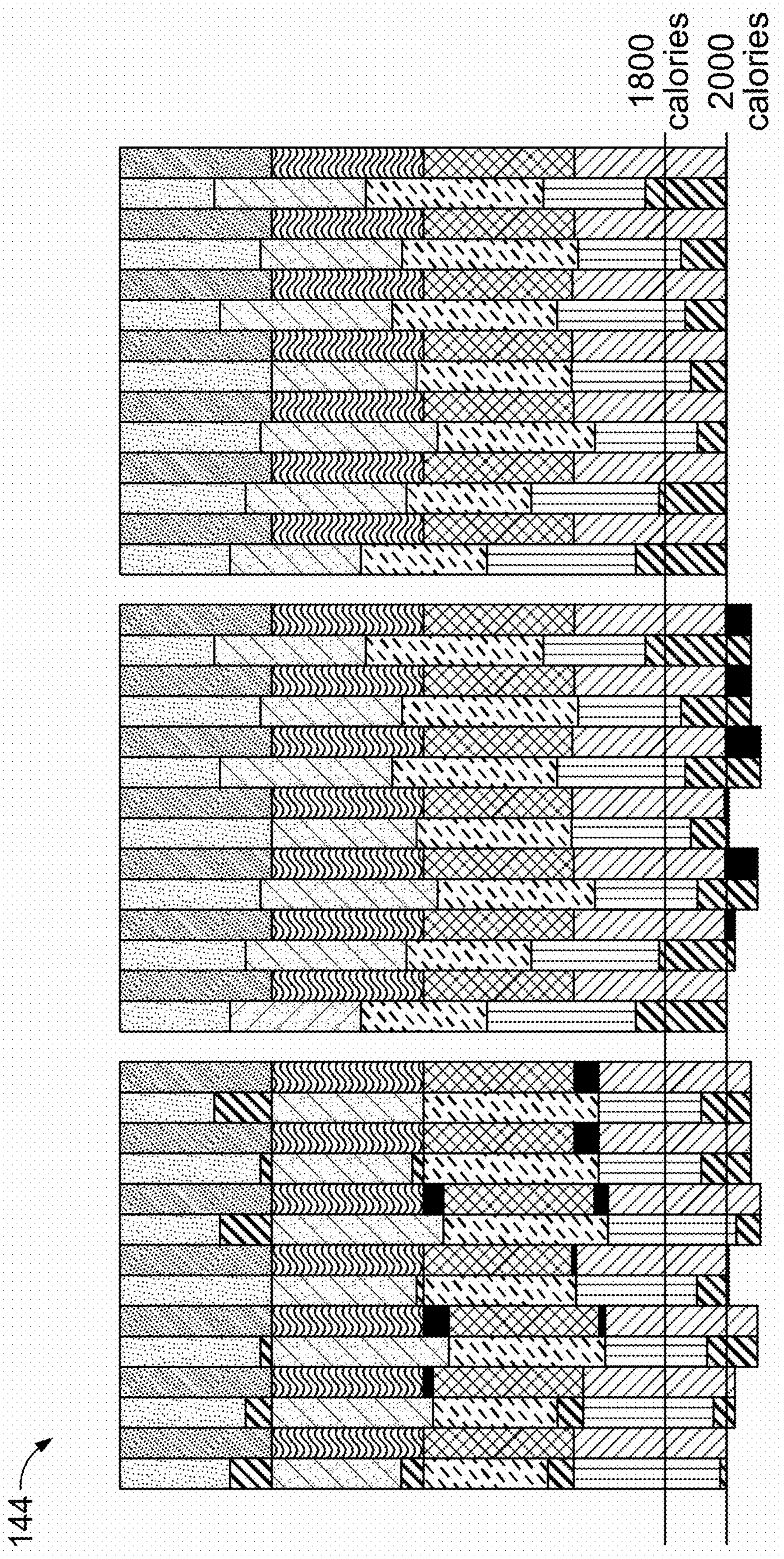

FIG. 9 illustrates a fourth visualization interface 144 generated by the systems and methods of the present disclosure. As shown therein, while any of the three meals "pieces" variations can be used directly to represent a week, only the fully aggregated is informative with a target bar. Assuming a 2000 calorie maintenance recommendation, and targeted deficit (as recommended by the USDA) of 200 calories per day, the visualization shows how the actually consumed meals compare against the recommendation.

As noted above, the systems and methods (and their visualizations) could be applied to a variety of domains, including any domain in which target outcomes and actual recording are compared. Health care domains include, but are not limited to, protein versus calories, nutrition balance, physical therapy, and habit formation. Energy consumption domains include, but are not limited to, total energy use versus energy produced by solar panels, car maintenance and fuel consumption, etc. Education domains include, but are not limited to, normative student outcomes versus actual performance.

Still another domain having applicability to the systems and methods of the present disclosure include personal or small business finance, e.g., making it easier for someone not that familiar with or comfortable with traditional financial reports. Examples include:

1. The "big picture"/zooming out—could provide a person's overall financial health (conveyed by the visualization patterns disclosed herein), perhaps giving them new insights into areas they've never thought of before.
2. For visualizing net worth, a visualization "block" (e.g., the triple of pieces referred to) could represent:
   a. A single asset (stock, fund, 401k, real estate, vehicle, boat, plane, etc.)
      i. The block represents a position in that investment.
         1. Cost Basis
         2. Current Value
         3. Difference is represented as total gain/loss
   b. A single liability (mortgage, credit card, other loans, etc.)
      i. The block represents an obligation for that liability, or past due amount, or delinquency.
         1. Total borrowed or owed
         2. Cumulative payments made
         3. Difference is represented as the outstanding balance
3. For income statements, each block could represent:
   a. A single income source (salary, royalty, rental income)
      i. The block represents an estimated income for that source and time period
         1. Total estimated income
         2. Actual income
         3. Difference indicates whether an individual is below or above the estimated income
   b. A single expense (loan payments, house-hold expenses, vacations)
      i. The block represents the planned expense item (although loan payments are mostly fixed, things like housing expenses would be variable)
         1. Planned amount
         2. Amount spent
         3. Difference indicates whether an individual is over or under that particular planned expense The systems and methods herein can perform data comparison where a difference provides essential insight into the question or problem and can be visualized. For example, student progress ranging from a curricular activity to standardized test results can inform comparison of a student's performance to a normative target. A numeric value out of context provides little insight into what knowledge or skills a student has gained. Providing a difference measure between a norm and a student's performance is enhanced with the potential to 'drill down' from an aggregate 'score' or 'rubric assignment' to examine the component performances to directly identify causes for concern or potential for enrichment.

The visualization components of the systems and methods of the present invention include a triple of pieces: two data objects that are retrieved from one or more resources, and a difference object that is defined as the quantitative difference between the two data objects. Provenance of the data objects as well as that of the difference object is maintained throughout, to support methods/algorithms to "drill down" into the data analysis behind each of the data objects, and "build up" new pieces from previously defined data and difference objects, or combine pieces into "rows" and "blocks" to form more complex representations. Finally, a data piece "summary" object can be generated from rows and blocks of pieces. Enhanced visualization ability comes from domain specific heuristics for choosing the order of the two data pieces (top/bottom or left right) position of the difference piece (relative to the smaller data object: (before or after), color (or image), opacity, relative depth of the piece, and piece orientation (horizontal/vertical).

Figure 10:
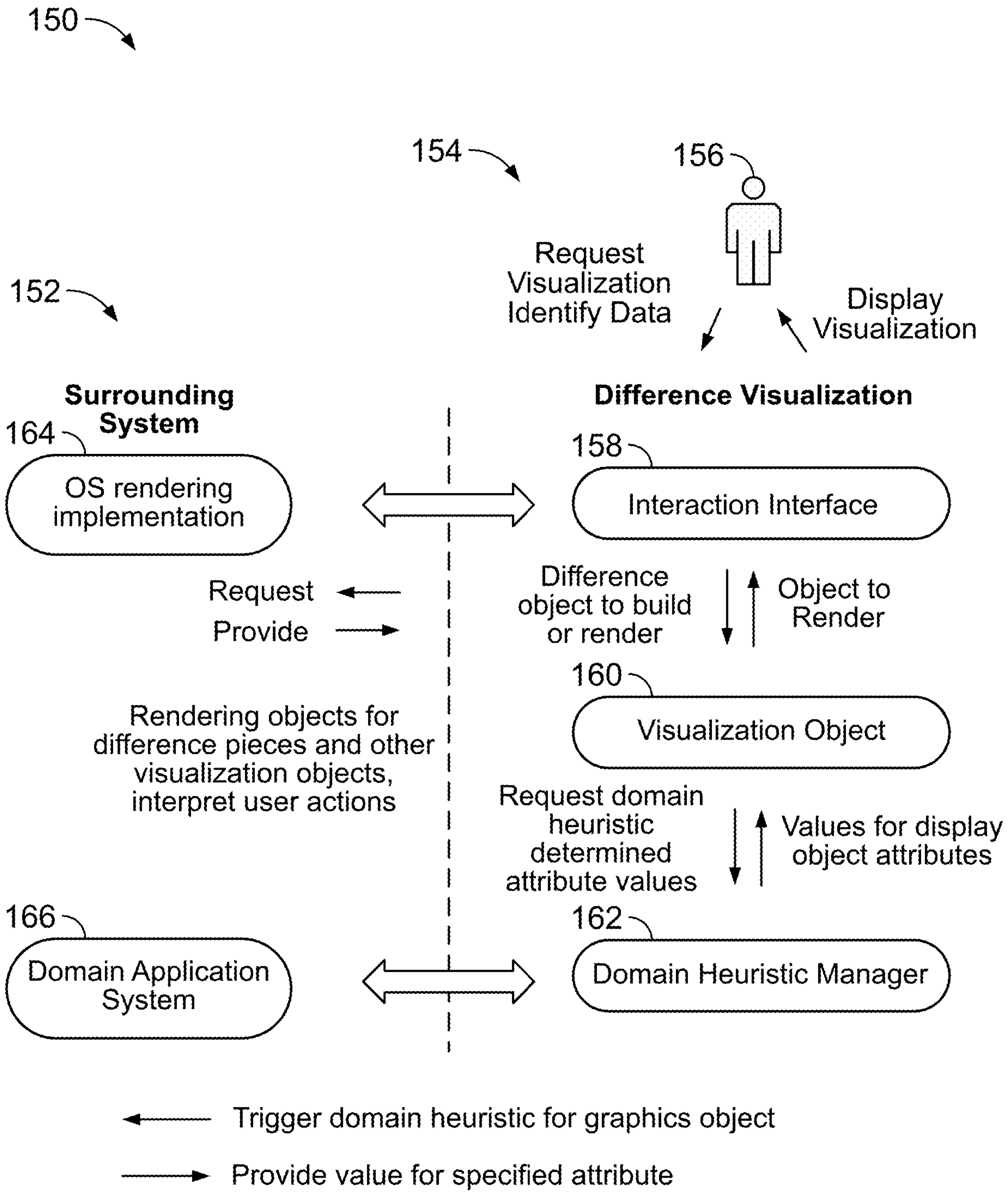
FIGS. 10-18 are diagrams illustrating processing steps carried out by the systems and methods of the present disclosure for generating the visualization interface of FIGS. 6-9, and associated software components.

FIG. 10 is a flowchart, indicated at 150, illustrating components of the visualization system and their interactions. First, a request 154 for a visualization is issued by a user 156 and received and processed by a software interaction interface 158. The interface 158 then requests a difference object to be built or rendered, resulting in a visualization object 160. The object 160 then requests a domain heuristic and passes determined attribute values to a domain heuristic manager 162. The domain heuristic manager 162 then passes values for the visualization object 160, which is then passed to the interaction interface 158 for rendering and display of the visualization to the user 156. Surrounding system components 154 such as an operating system (OS) rendering implementation 164 and domain application system 166 also interact with system, such that the OS rendering implementation 164 interacts with the interaction interface 158 by requesting and providing rendering objects for the difference pieces and other visualization objects, as well as interpreting user interactions. Additionally, the domain application system 166 receives triggers for domain heuristics for graphics objects, and provides values for specified attributes to the domain heuristic manager 162.

Figure 11A:
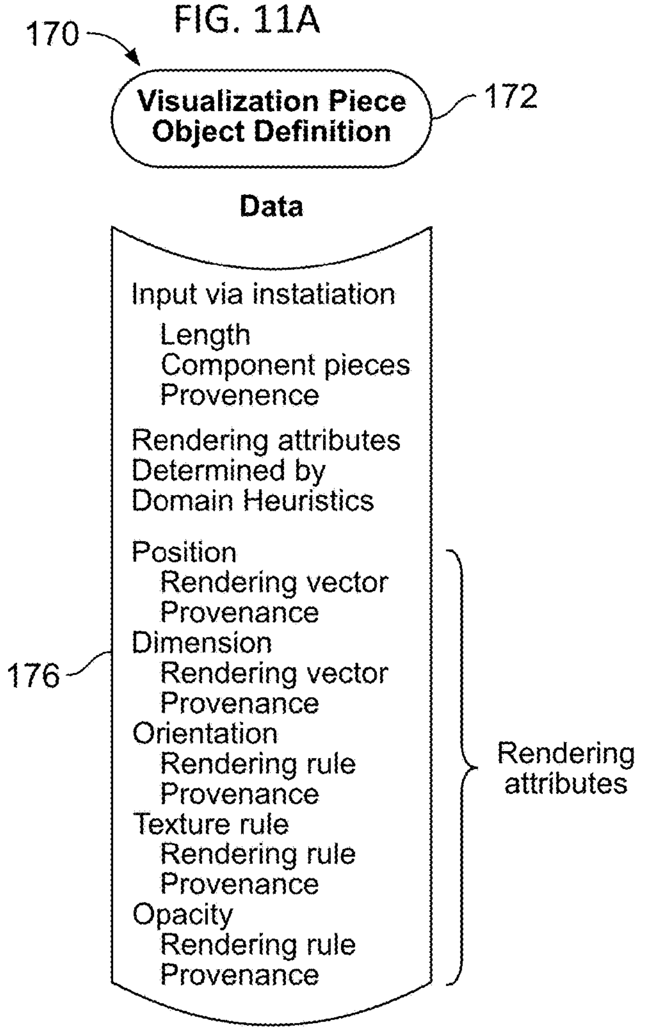
Figure 11B:
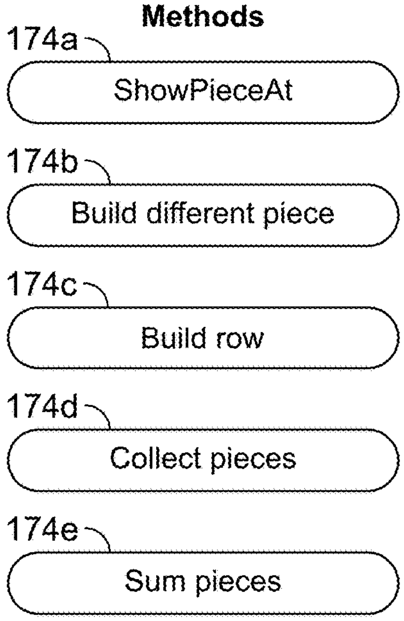
Figure 11C:
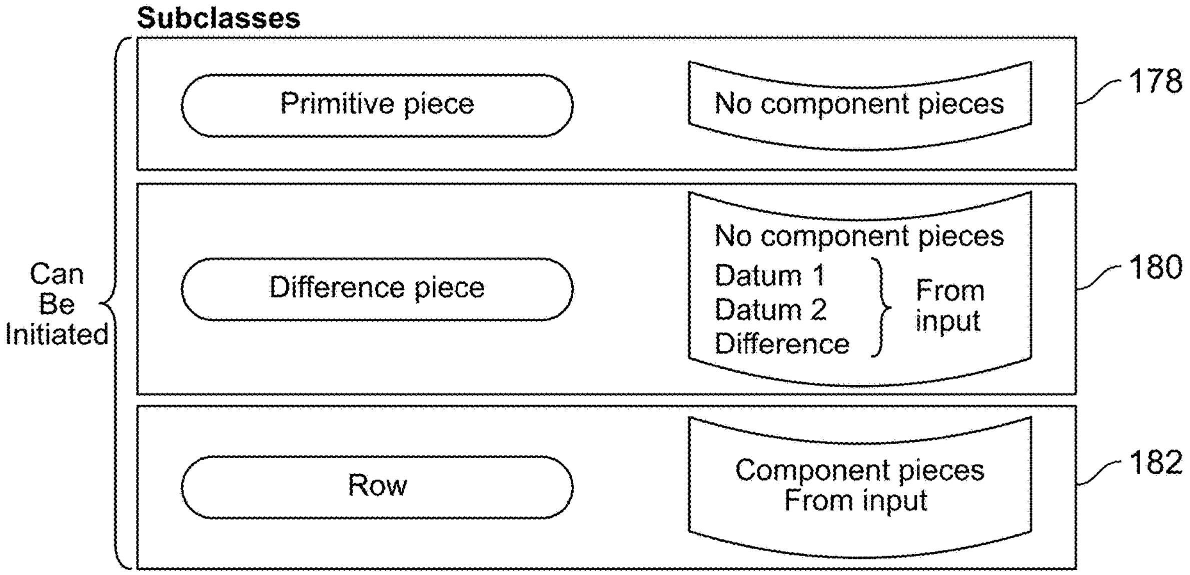

FIGS. 11A-C show a diagram 170 illustrating software objects and associated methods implemented by the visualization system of the present disclosure. Components include a visualization piece object definition 172, data 176, software methods 174$a$-174$e$, and software subclasses 178-182 which can be instantiated (e.g., in an object-oriented programming language). The abstract superclass is defined as a shape with base attributes of position, dimensional attributes (e.g., width and length), orientation in space (e.g., horizontal or vertical), fill (solid, patterned, image, textured), and opacity (alpha value). The superclass is an abstraction of a standard definition for rendering an object as computer graphics but can accommodate extensions to rendering in physical space (e.g., 3D printing, laser cutting, and future representations of physical 'pieces'). The position of any piece is rendered relative to its parent. The root piece position is rendered within the coordinate system of its display object. For clarity, the illustrations provided herein are in 2D with 'fill' limited to standard graphics pixel color schemes.

A unique aspect of the definition is that each visual attribute includes its provenance, which can be used to visually examine its origins. The surrounding system can use this to "drill down" within any piece providing dashboard capability to provide multi-modal visualizations as well as interaction to allow users to construct sophisticated visualizations that combine visualization pieces with other informative visual modalities such as traditional graphs, text boxes, and animations. The attributes and value pairs are intentionally implemented as natural language-based tokens so that accessibility functions can be employed to render in appropriate modalities for the visually impaired.

The subclasses 178-182 include:

1. A primitive piece is a shape (illustrated as a rectangle), where the length is defined as a scaled unit of measure of an input quantity (such as calories in a ratio of 5 calories per pixel). Remaining dimensions, fill, and opacity are dependent upon domain heuristics. A single datum has a context that is illustrated through the remaining dimensions via the domain heuristics. Each of those heuristic choices can be examined via the input data provenance via the interaction interface. Consequently, the origin or rationale for reducing complex information to a single data point can be examined and not simply taken as absolute.
2. A difference piece is constructed from three primitive pieces. Placement of the three pieces relative to each other, as well as their remaining attributes, is determined by domain heuristic rules. This piece is the core construct of the system, and includes the following:

Two measured quantities (M1 with the same unit of measure where each input quantity defines the length of the component pieces (e.g., actual and recommended calories)).

A difference piece whose length is calculated as the absolute value of the difference between the two measured quantities.

3. A row is a sequence of pieces with identical widths (determined from domain heuristics). The pieces are oriented relative to the row and are stacked sequentially so that the sum of their lengths defines the length of the row, and the width of the row is defined as the standard width of all of the pieces. A row can be used represent one measured quantity in a difference piece. The widths need to be identical to support block construction and maintain the integrity of the overall visualization of the differences.
4. A block is a sequence of rows in a dimension different from the rows from which it is constructed. The length of the block is defined as sum of the width of its component pieces. The length of the block is the longest length of the rows. The length of a row can be "ragged."

Figure 12A:
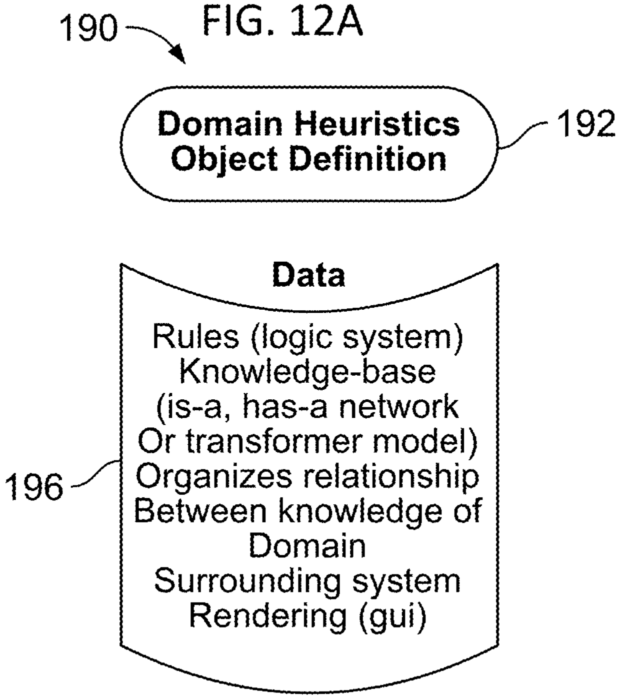
Figure 12B:
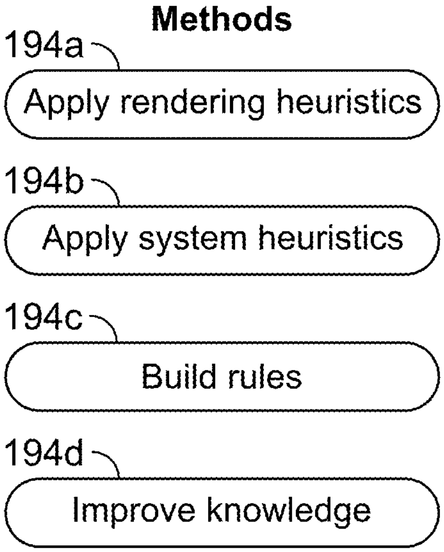
Figure 13A:
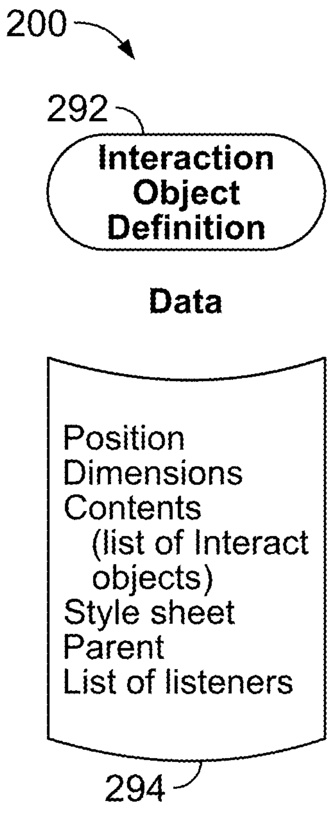
Figure 13B:
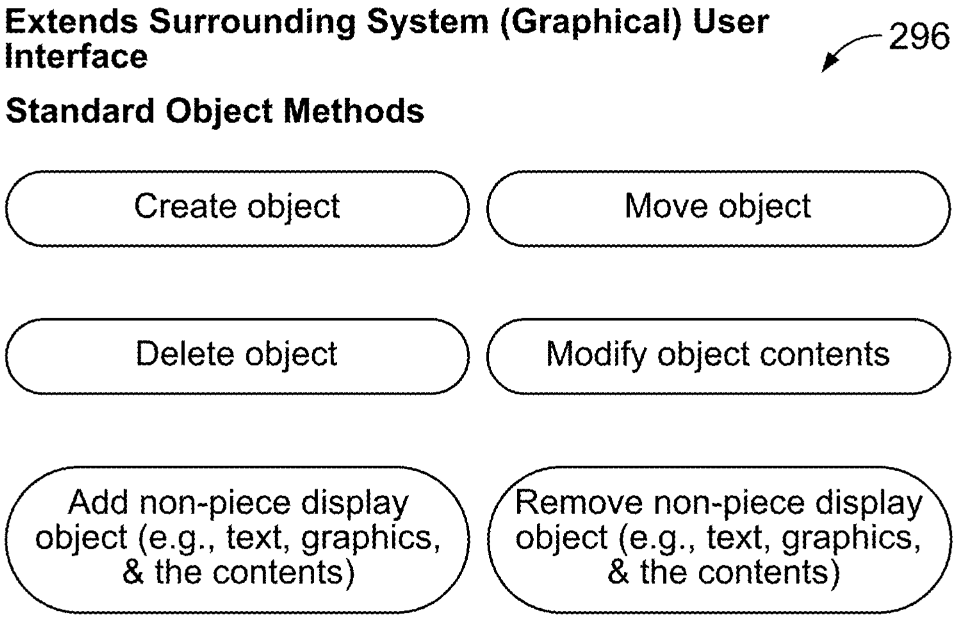
Figure 13C:
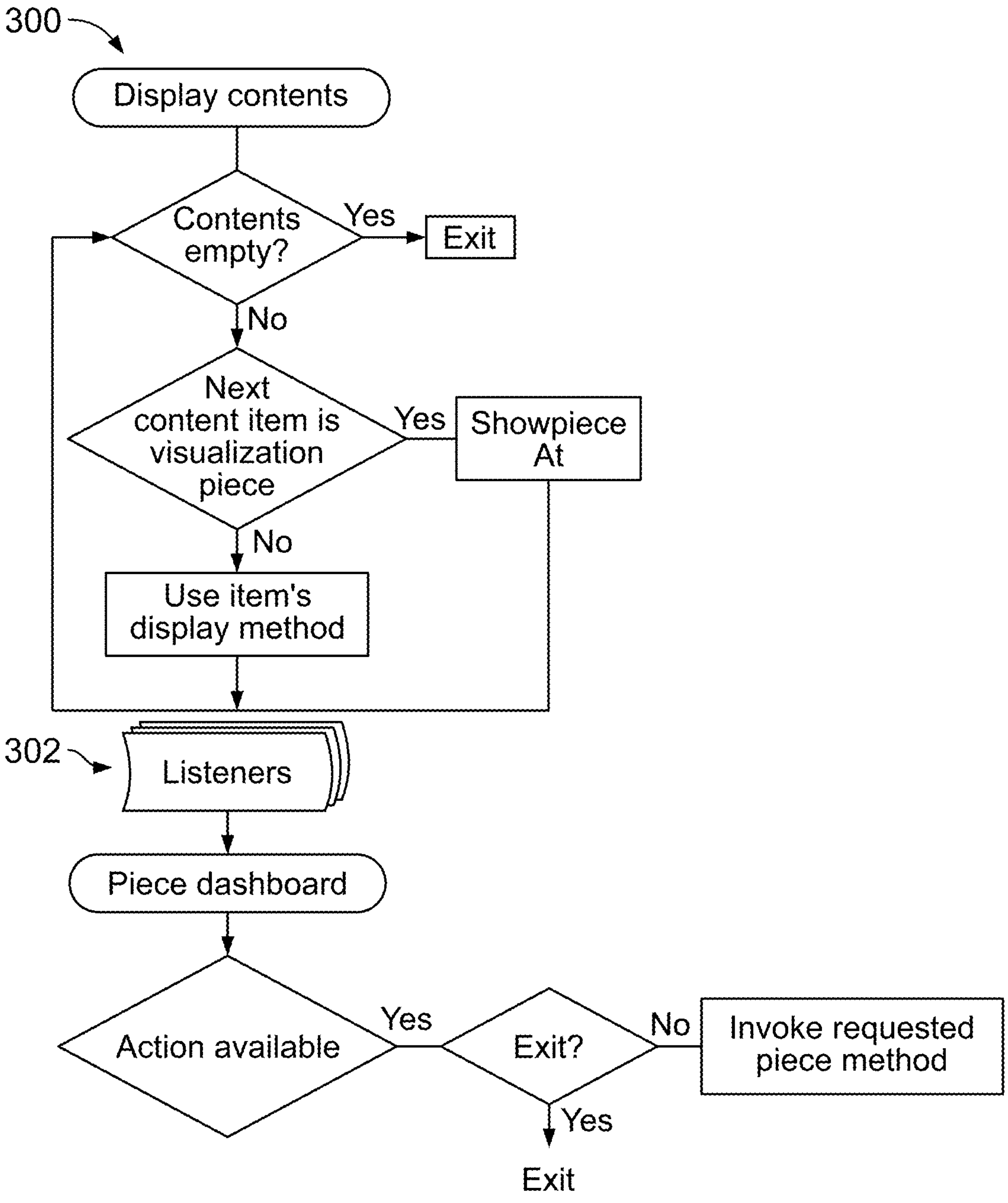
Figure 13D:
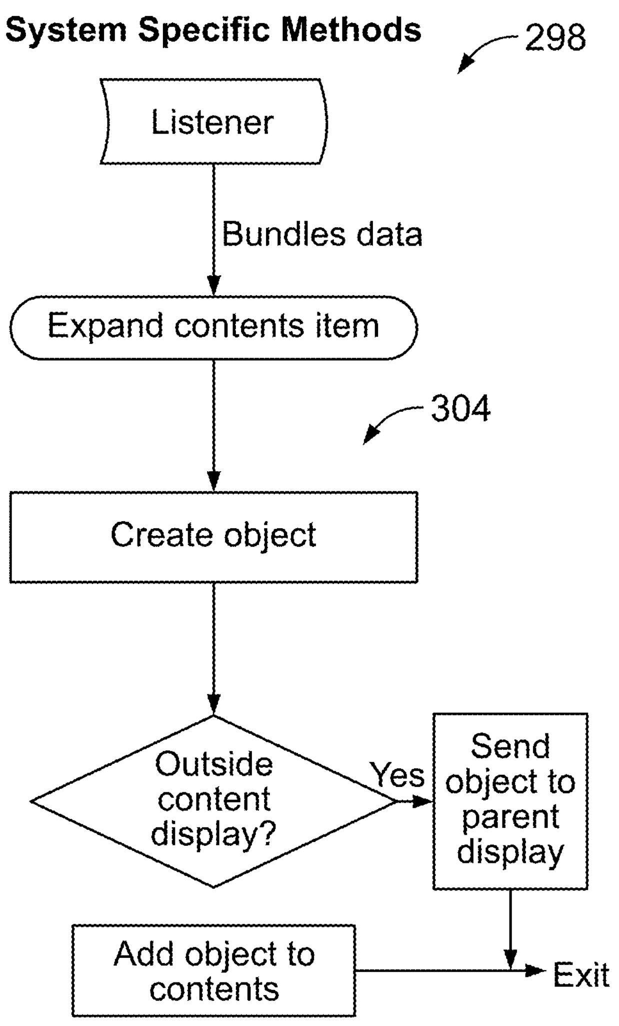

FIGS. 12A-B show a diagram 190 illustrating domain heuristic object definitions 192 in accordance with the present disclosure, as well as associated data 196 and software methods 194$a$-194$d$ (including a method 194$a$ for applying rendering heuristics, a method 194$b$ for applying system heuristics, a method 194$c$ for building rules, and a method 194$d$ for improving a knowledge base). The domain heuristics object captures the relevant domain knowledge through both "is-a" and "has-a" bidirectional hierarchies. The actual implementation of heuristic knowledge can range from a simple look up table, to a series of search structures, to a transformer model generated by machine learning trained by AI engineers. The instantiated object for a domain receives a request to determine the data objects of the visualization object as shown.

The following example is given in connection with a visualization of a meal. When the meal is breakfast, the actual datum is blue and the recommended is aqua. For any meal:

If the actual is less than the recommended and the objective is to gain weight, then the difference piece is red.

The difference piece is green if:

the actual is less than the recommended and the objective is to lose weight, OR the actual is greater than the recommended and the objective is to gain weight The difference piece is red if:

The actual is less than the recommended and the objective is to gain weight, OR

The actual is greater than the recommended and the objective is to lose weight

All of the other attributes are hard-coded to values for this illustration, but could be determined by rules such as:

If the provenance of the datum came from a nutrition label or the USDA Food Data website then the opacity is 'solid' otherwise the opacity is 50%

If the piece represents a single meal, then then show the piece horizontally with the actual above the recommended.

If the piece represents a single day, then show the piece vertically with actual to the left of recommended.

If the user specified focus is on the actual, then make the recommended half the depth.

The visualization object attributes can be determined by static (compile time) or run time (user initiated) rules established in the domain heuristic object.

FIGS. 13A-D show a flowchart 200 illustrating both an 'is-a' and 'has-a' structure that supports dynamic editing of the input data, as well as the visualization pieces and resulting visualization. It is a standard 'dashboard" that gives access to all of the object methods defined here. The components include an interaction object definition 292, data 294, and standard object methods 296, all of which extend the graphical interface of the surrounding system. The standard object methods 296 include a create object method, a delete object method, a move object method, a modify object contents method, and methods for adding and removing non-piece display objects. Additionally provided are system-specific methods 298 including display control method 300, dashboard control method 302, and display control method 304.

Importantly, the interface supports multiple layers of pieces. For example, selecting breakfast from a day composite piece will instantiate a new window with all of the functionality of the parent window. Parent-child relationships are maintained behind the scenes, but free motion within any window supports user-initiated organizations. The interaction objects also support 'corralling' visualization pieces into a row that in turn can be combined into a block. The "pieces" attribute of a piece represents a row or block depending on the structure of the pieces.

Figure 14:
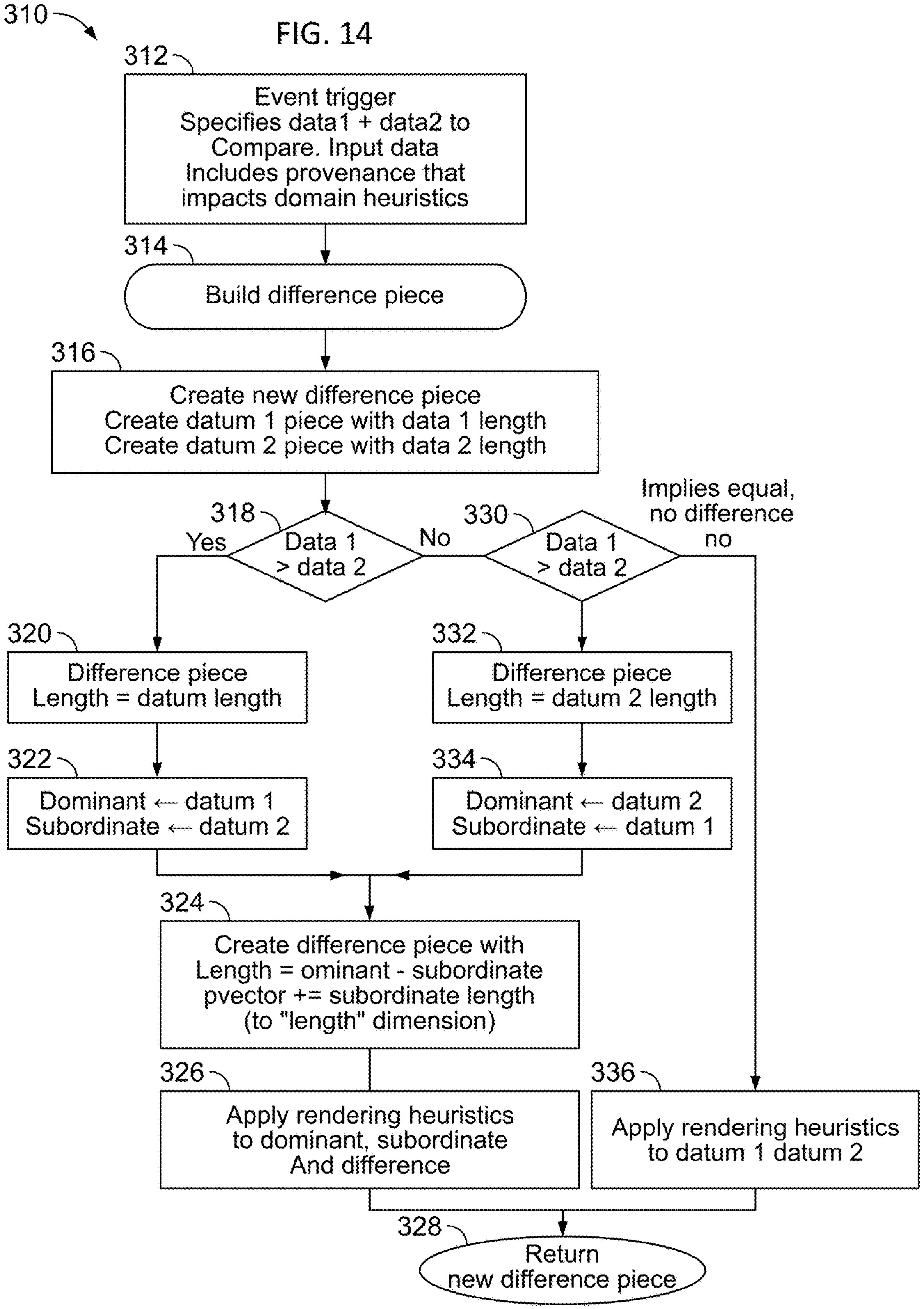

FIG. 14 is a flowchart, indicated generally at 310, illustrating process steps for constructing the base case of Piece of two measured quantities with the same unit of measure (labeled larger and smaller) and their difference. The component pieces are positioned relative to the piece being created, their lengths are scaled, and their remaining attributes are calculated from domain heuristics. Their relative placement is determined by domain heuristics: top/bottom for horizontal configurations, left/right for vertical. The difference piece is always attached to the smaller piece via the buildRow method, that is, the order of the two pieces (top/bottom, left/right) is determined by domain heuristics. Note that primitive pieces are instantiated within the construction of a difference. The method returns a piece whose three component pieces (larger, smaller, difference) can be read by other methods.

In step 312, an event trigger occurs, which specifies two data items to be comparted (data1 and data2) and also includes (as input) provenance that impacts domain heuristics. The "build difference piece" method 314 is then instantiate, and in step 316, the system creates a new difference piece. Additionally, a first datum piece (datum1) is created with a length of data1, and a second datum piece (datum2) is created with length of data2. Next, in step 318, a determination is made as to whether data1 is greater than data2. If so, step 320 occurs, wherein the length of the difference piece is set to the length of datum1. Then, in step 322, the dominant piece is set as datum1, and the subordinate piece is set as datum2. Then, step 324, discussed below, occurs.

In the event that a negative determination is made in step 318, step 330 occurs, wherein a determination is made as to whether data1 is less than data2. If not (implying that data1 and dat2 are equal and there is no difference), step 336 occurs, wherein the system applies rendering heuristics to datum 1 and datum 2. Otherwise, step 332 occurs, wherein the length of the difference piece is set to the length of datum2. Then, in step 334, the dominant piece is set to datum2, and the subordinate piece is set to datum1.

In step 324, the system creates a difference piece having a length equal to the difference in lengths between the dominant piece and the subordinate piece. In step 326, the system applies rendering heuristics to the dominant piece, the subordinate piece, and the difference piece. Finally, in step 328, the system returns a new difference piece.

Figure 15:
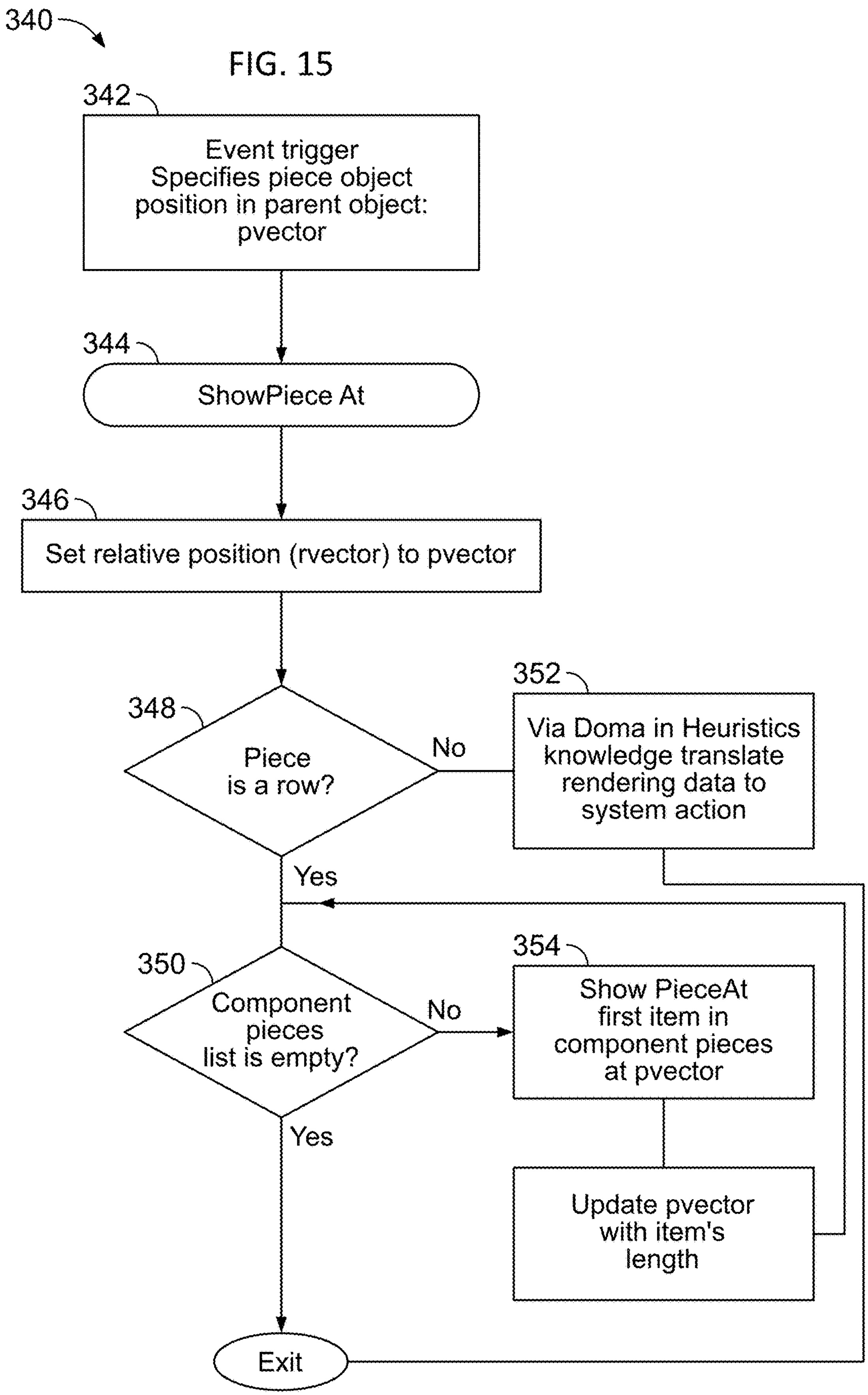

FIG. 15 is a flowchart 340 illustrating processing steps for recursively displaying the components of a piece (e.g., the difference relationship between two data items with the same unit of measure). Component pieces are placed relative to the root piece (defaulting to upper left). Beginning in step 342, an event trigger is received which specifies the position of the piece object within the parent object. In step 344, the "showPieceAt" method is instantiated, and in step 346, the system sets relative positions (the "rvector" position is set to "pvector"). In step 348, a determination is made as to whether the current piece is a row. If not, step 352 occurs, wherein the system translates rendering data to system actions using domain heuristics. Otherwise, step 350 occurs, wherein a determination is made as to whether a component piece list is empty. If so, processing ends. Otherwise, step 354 occurs, wherein the first item in the piece is processed, and then in step 356, the piece vector is updated with the item's length.

Figure 16:
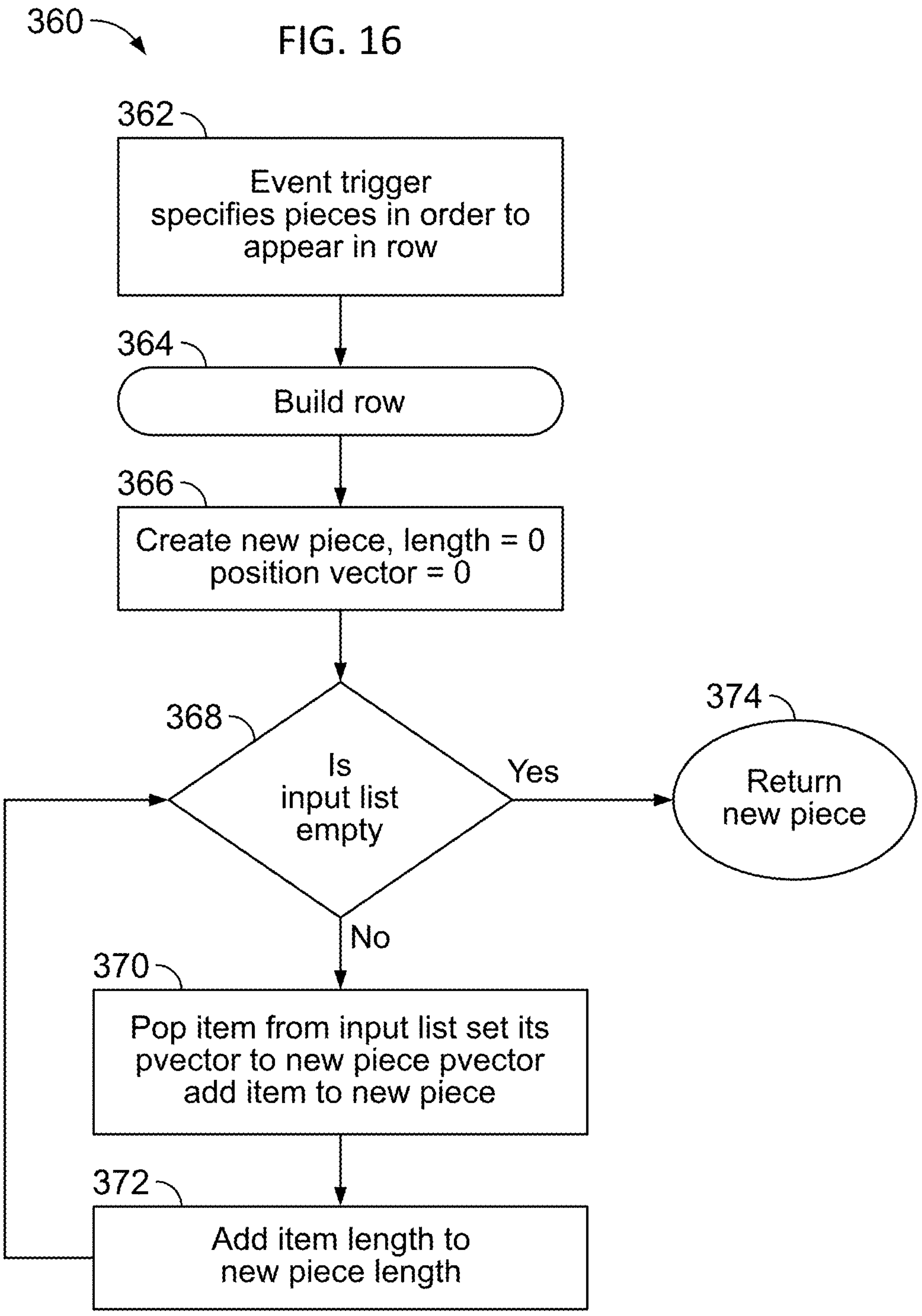

FIG. 16 is a flowchart 360 illustrating processing steps for creating a piece from a list of pieces, creating a row of pieces of the same width, and stacking them into a length that is the sum of their lengths. The order of the pieces is determined by the sequence in the list. The position of each component piece is relative to the newly created piece. In step 362, an event trigger is received by the system and specifies piece in order to appear in a row. In step 364, the "build row" method is instantiated, and in step 366, the system creates a new piece having a length of zero and a position vector set to zero. In step 368, a determination is made as to whether the input list is empty. If so, step 374 occurs, wherein the new piece is returned. Otherwise, step 370 occurs, wherein the system pops the item from the input list, sets its pvector to a new piece pvector, and adds the item to the new piece. In step 372, the system adds the item length to the new piece length.

Figure 17:
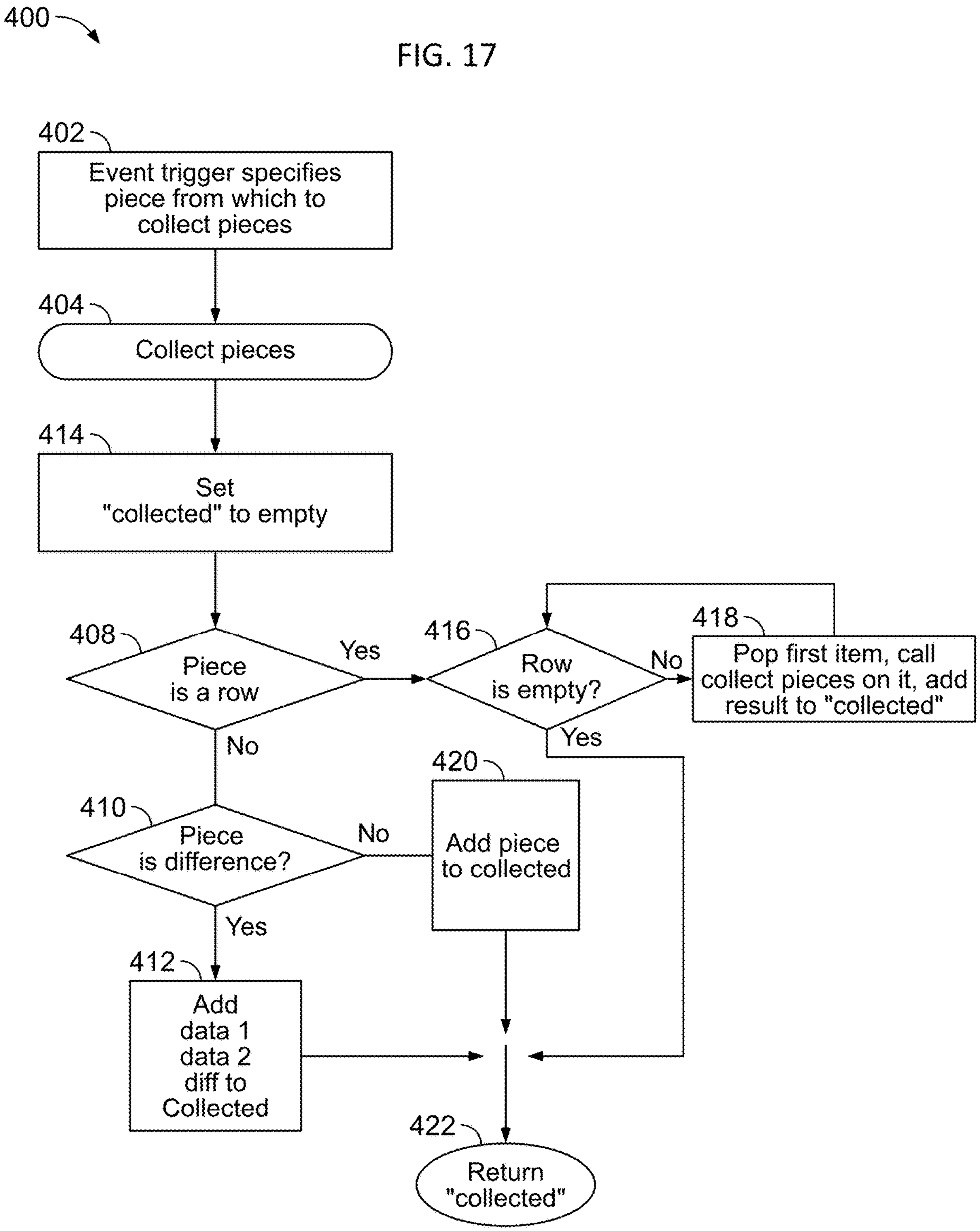

FIG. 17 is a flowchart 400 illustrating processing steps for returning a list of pieces based on an attribute list specified as input. In step 402, an event trigger is received by the system which specifies a piece from which to collect pieces.

In step 404, a "collect pieces" method is instantiated, and in step 414, the system sets a "collected" data structure to empty. In step 408, a determination is made as to whether the current piece is a row. If not, step 410 occurs, wherein a determination is made as to the current piece is a difference piece. If so, step 412 occurs, wherein the system adds data1, data2, and the difference piece to the collected data structure. Then, in step 422, the collected data structure is returned. If a negative determination is made in step 408, step 416 occurs, wherein a determination is made as to whether the row is empty. If not, step 418 occurs, wherein the system pops the first item, calls the collect pieces method on it, and adds the result to the collected data structure. Otherwise, step 422 occurs. Finally, if a negative determination occurs in step 410, step 420 occurs, wherein the system adds the piece to the collected data structure. Thereafter, step 422 occurs.

Figure 18:
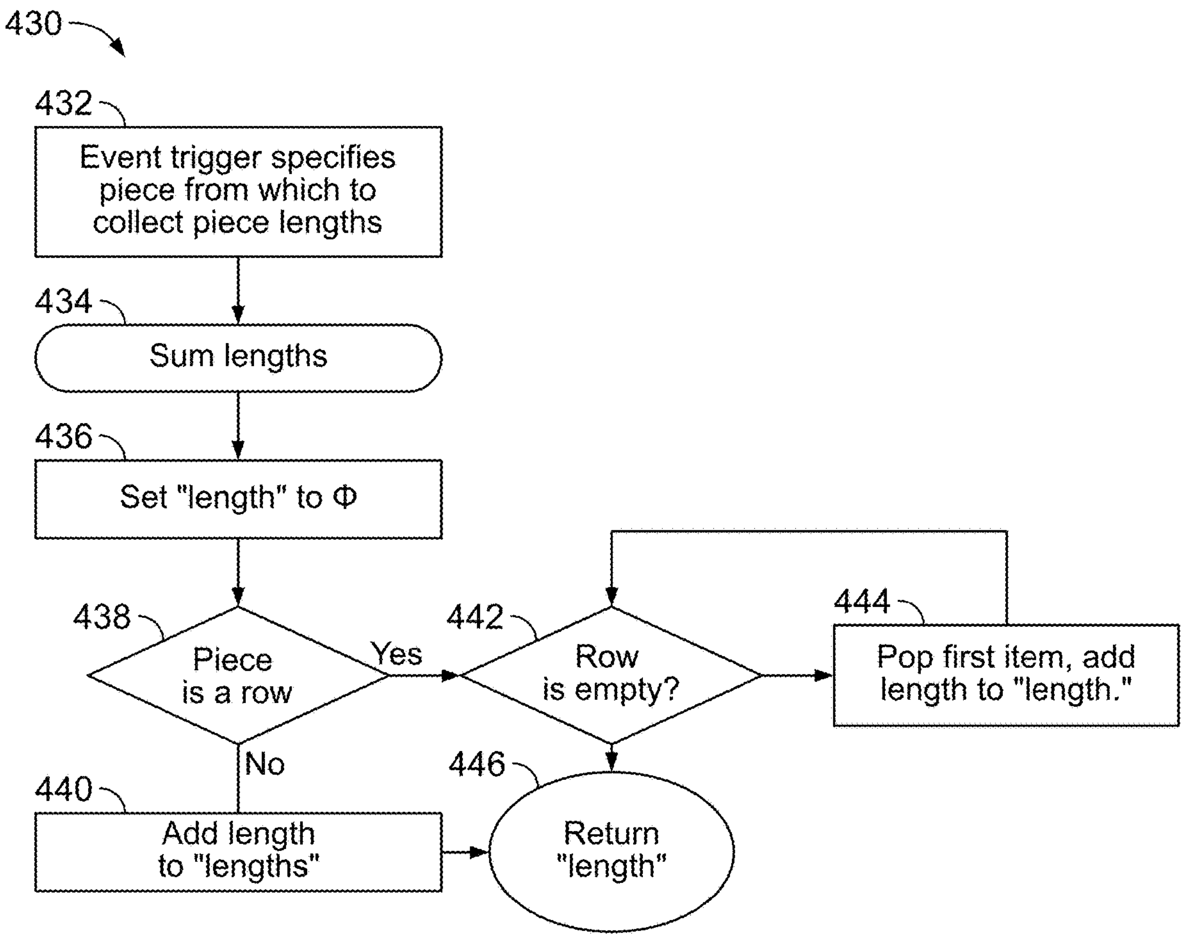

FIG. 18 is a flowchart 430, illustrating processing steps for returning a piece whose length is the sum of the lengths of a list of pieces, and uses domain heuristics to determine the remaining attributes. In step 432, an event trigger is received by the system, which specifies a piece from which to collect piece lengths. In step 434, a "sum lengths" method is instantiated, and in step 436, the system sets a length value to zero. In step 438, a determination is made as to whether the current piece is a row. If not, step 440 occurs, wherein the system adds the length to the length value, and in step 446, the system returns the length value. If a positive determination is made in step 438, step 442 occurs, wherein the system determines whether the row is empty. If so, step 446 occurs. Otherwise, step 444 occurs, wherein the system pops the first item and adds the length to the length value.

The domain heuristic object is an "API" for the system that mediates between an external decision-making system and the visualization system. Consequently, the API consists of methods to retrieve required attribute values for a piece as summaries. When a piece is being built, it calls the relevant Domain Heuristic method whose implementation is defined by the surrounding system. Information querying is two way: the surrounding system can both request and provide information so that visualization decisions are not static but can be updated dynamically in real time.

Like the Domain Heuristics Object, the Interaction Object is an "API" for the system. The abstract object is a generic display that has a position in a visual rendering system such as a web window, and an interaction API definition through which to manipulate both the position and size of an instantiated display and the internal contents of the display. Each piece has a provenance, either input data (that also has a provenance), or the originating instantiation of the piece (via build methods). If the surrounding system maintains a provenance discipline (e.g. provides a provenance with raw input data) then an appropriate display hierarchy can be constructed by the surrounding system.

The visualization system described herein illustrates the difference between two datum with the same unit of measure. The power of the system is the recursive inclusion of data provenance. The developer of the surrounding system can provide displays and interaction that appropriately constrain or allow examination and reorganization of the input data without either overwhelming the user, or misrepresenting the data and its origins.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for partial information retrieval comprising:

a partial information retrieval processor in communication with a data source;

an event trigger agent executed by the processor, the event trigger software agent identifying an event;

a query listener agent executed by the processor and generating a query in response to the identified event;

a partial information retrieval agent executed by the processor and processing the query in accordance with a modular domain heuristic data structure and generating response data that includes provenance information, the modular domain heuristic data structure guarding against hallucinations in the response data;

a knowledge base updating agent executed by the processor, the knowledge base updating agent updating a knowledge base using the response data, wherein the knowledge base updating agent generates the modular domain heuristic data structure, and the modular domain heuristic data structure includes domain knowledge, a domain heuristic, and at least one partial information retrieval heuristic, wherein the domain heuristic comprises a domain-specific heuristic, and wherein the domain-specific heuristic comprises a food-specific domain heuristic including a food quantity heuristic, a food type heuristic, a food source heuristic, a data origin indicator, an amount origin indicator, and a type origin indicator; and a visualization software object for generating a visualization in a user interface, the visualization software object including at least one visualization attribute that controls rendering and display of the visualization by the user interface and data provenance information associated with the at least one visualization attribute, the data provenance information visually examinable in the user interface to determine an origin of the at least one visualization attribute.

2. The system of claim 1, further comprising a response generator agent executed by the processor, the response generator agent generating at least one human-readable response based on the response data.

3. The system of claim 2, wherein the response generator agent causes the event trigger agent to trigger an event.

4. The system of claim 1, wherein the response comprises a natural language answer.

5. The system of claim 1, wherein the response comprises a response data structure having at least one data provenance chain.

6. The system of claim 1, wherein the query listener agent generates a query data structure including a question type, a question context, and provenance data.

7. The system of claim 1, wherein the visualization interface displays at least one visualization piece that visualizes the response data.

8. The system of claim 7, wherein the at least one visualization piece includes a first section which graphically illustrates an actual value, a second section which graphically illustrates a recommended value, and a difference section which graphically illustrates a difference between the actual value and the recommended value.

9. A method for partial information retrieval comprising:

providing a partial information retrieval processor in communication with a data source;

identifying the occurrence of an event using an event trigger agent executed by the processor;

generating a query by a query listener agent executed by the processor in response to the identified event; and processing the query in accordance with a modular domain heuristic data structure using a partial information retrieval agent executed by the processor;

generating response data that includes provenance information, the modular domain heuristic data structure guarding against hallucinations in the response data;

updating a knowledge base by a knowledge base updating agent executed by the processor and using the response data, wherein the knowledge base updating agent generates the modular domain heuristic data structure, and the modular domain heuristic data structure includes domain knowledge, a domain heuristic, and at least one partial information retrieval heuristic, wherein the domain heuristic comprises a domain-specific heuristic, and wherein the domain-specific heuristic comprises a food-specific domain heuristic including a food quantity heuristic, a food type heuristic, a food source heuristic, a data origin indicator, an amount origin indicator, and a type origin indicator; and generating a visualization in a user interface using a visualization software object, the visualization software object including at least one visualization attribute that controls rendering and display of the visualization by the user interface and data provenance information associated with the at least one visualization attribute, the data provenance information visually examinable in the user interface to determine an origin of the at least one visualization attribute.

10. The method of claim 9, further comprising generating at least one human-readable response based on the response data using a response generator agent executed by the processor.

11. The method of claim 10, wherein the response generator agent causes the event trigger agent to trigger an event.

12. The method of claim 9, wherein the response comprises a natural language answer.

13. The method of claim 9, wherein the response comprises a response data structure having at least one data provenance chain.

14. The method of claim 9, wherein the query listener agent generates a query data structure including a question type, a question context, and provenance data.

15. The method of claim 9, wherein the visualization interface displays at least one visualization piece that visualizes the response data.

16. The method of claim 15, wherein the at least one visualization piece includes a first section which graphically illustrates an actual value, a second section which graphically illustrates a recommended value, and a difference section which graphically illustrates a difference between the actual value and the recommended value.

* * * * *